(12) United States Patent
Riehle et al.

(10) Patent No.: US 11,794,464 B2
(45) Date of Patent: *Oct. 24, 2023

(54) ABSORBENT FLUFF AND TISSUE LAMINATE PADS FOR FOOD PACKAGING

(71) Applicant: Novipax Buyer, LLC, Oakbrook, IL (US)

(72) Inventors: Lindsay Riehle, Loma Linda, CA (US); Brett Stoll, Fontana, CA (US); Frank Vaughn, Winona, MS (US); Sophia Smeragliuolo, Claremont, CA (US); Rich Beu, Watkinsville, GA (US)

(73) Assignee: Novipax Buyer, LLC, Oak Brook, IL (US)

( * ) Notice: Subject to any disclaimer, the term of this patent is extended or adjusted under 35 U.S.C. 154(b) by 208 days.

This patent is subject to a terminal disclaimer.

(21) Appl. No.: 17/140,407

(22) Filed: Jan. 4, 2021

(65) Prior Publication Data

US 2021/0213725 A1 Jul. 15, 2021

Related U.S. Application Data

(63) Continuation of application No. 15/952,879, filed on Apr. 13, 2018, now Pat. No. 10,882,295.

(Continued)

(51) Int. Cl.
| | |
|---|---|
| *B32B 38/08* | (2006.01) |
| *B32B 5/02* | (2006.01) |
| *B32B 27/10* | (2006.01) |
| *B32B 27/32* | (2006.01) |
| *B32B 29/02* | (2006.01) |
| *B32B 29/00* | (2006.01) |
| *B32B 21/02* | (2006.01) |
| *B32B 21/06* | (2006.01) |

(Continued)

(52) U.S. Cl.
CPC .............. *B32B 38/08* (2013.01); *B32B 5/022* (2013.01); *B32B 7/12* (2013.01); *B32B 21/02* (2013.01); *B32B 21/06* (2013.01); *B32B 21/08* (2013.01); *B32B 21/10* (2013.01); *B32B 27/10* (2013.01); *B32B 27/32* (2013.01); *B32B 29/005* (2013.01); *B32B 29/02* (2013.01); *B32B 37/02* (2013.01); *B32B 37/10* (2013.01); *B32B 37/12* (2013.01); *B32B 37/206* (2013.01); *B65D 81/264* (2013.01); *B65D 81/267* (2013.01); *B32B 2260/026* (2013.01); *B32B 2260/028* (2013.01); *B32B 2260/04* (2013.01); *B32B 2262/02* (2013.01); *B32B 2264/108* (2013.01); *B32B 2307/7145* (2013.01); *B32B 2307/726* (2013.01); *B32B 2307/7265* (2013.01); *B32B 2307/74* (2013.01); *B32B 2313/04* (2013.01); *B32B 2317/12* (2013.01); *B32B 2317/16* (2013.01); *B32B 2323/04* (2013.01); *B32B 2323/10* (2013.01); *B32B 2439/70* (2013.01); *B32B 2553/00* (2013.01)

(58) Field of Classification Search
CPC .......... B32B 38/08; B32B 5/022; B32B 7/12; B32B 21/02; B32B 21/06; B32B 21/08; B32B 21/10; B32B 27/10; B32B 27/32; B32B 29/005; B32B 29/02; B32B 37/02; B32B 37/10; B32B 37/17; B32B 37/206; B32B 2260/026; B32B 2260/028; B32B 2260/04; B32B 2260/2262; B32B 2260/02; B32B 2260/2264; B32B 2260/108; B32B 2307/7145; B32B 2307/726; B32B 2307/7265; B32B 2307/74; B32B 2313/04; B32B 2317/12; B32B 2317/16; B32B 23/04; B32B 2323/10; B32B 2439/70; B32B 2553/00
USPC ....................................................... 502/402
See application file for complete search history.

(56) References Cited

U.S. PATENT DOCUMENTS

| | | |
|---|---|---|
| 3,575,287 A | 4/1971 | Graveley |
| 3,577,492 A | 5/1971 | Welsh et al. |

(Continued)

FOREIGN PATENT DOCUMENTS

| | | |
|---|---|---|
| EP | 0527228 A1 | 2/1993 |
| WO | 2005012132 A1 | 2/2005 |

(Continued)

OTHER PUBLICATIONS

"Boric Acid," National Center for Biotechnology Information. PubChem Compound Database; CID=7628, https://pubchem.ncbi.nlm.nlh.gov/compound/7628 (accessed Nov. 16, 2016).

(Continued)

*Primary Examiner* — Edward M Johnson
(74) *Attorney, Agent, or Firm* — Dorsey & Whitney LLP

(57) ABSTRACT

An absorbent pad has: a first, outer layer comprising a permeable or non-permeable film; a second, outer layer comprising a permeable or non-permeable film, placed on a side of the pad opposite the first, outer layer; a third layer disposed between the first layer and the second layer, and comprising a tissue laminate comprising at least a first ply and a second ply, with at least one chemical agent or system fixed in the third layer and being either activated by contact with or soluble in an aqueous liquid, the at least one chemical agent or system being in a predetermined amount distributed substantially uniformly per unit area of the surface area between the at least first ply and second ply: and a fourth layer disposed between the first layer and the second layer and comprising fluff, with or without a chemical agent or system, the third layer being joined to the fourth layer to serve as a substrate for the fourth layer.

16 Claims, 12 Drawing Sheets

Related U.S. Application Data

(60) Provisional application No. 62/641,048, filed on Mar. 9, 2018.

(51) Int. Cl.
*B32B 21/08* (2006.01)
*B32B 21/10* (2006.01)
*B32B 37/02* (2006.01)
*B32B 37/10* (2006.01)
*B32B 37/12* (2006.01)
*B32B 37/20* (2006.01)
*B65D 81/26* (2006.01)
*B32B 7/12* (2006.01)

(56) References Cited

U.S. PATENT DOCUMENTS

| | | |
|---|---|---|
| 3,814,101 A | 6/1974 | Kozak |
| 4,275,811 A | 6/1981 | Miller |
| 4,287,306 A | 9/1981 | Brewer |
| 4,332,845 A | 6/1982 | Nawata et al. |
| 4,384,972 A | 5/1983 | Nakamura et al. |
| 4,551,377 A | 11/1985 | Elves et al. |
| 4,589,876 A | 5/1986 | Van |
| 4,664,922 A | 5/1987 | Leon et al. |
| 4,762,722 A | 8/1988 | Izumimoto et al. |
| 4,856,650 A | 8/1989 | Inoue |
| 4,865,855 A | 9/1989 | Hansen et al. |
| 4,935,276 A | 6/1990 | Pawlowski et al. |
| 4,935,282 A | 6/1990 | Pawlowski et al. |
| 5,046,604 A | 9/1991 | Forhetz et al. |
| 5,154,960 A | 10/1992 | Mucci et al. |
| 5,273,769 A | 12/1993 | Lajoie et al. |
| 5,320,895 A | 6/1994 | Larsonneur et al. |
| 5,383,324 A | 1/1995 | Segers et al. |
| 5,436,067 A | 7/1995 | Hanamoto et al. |
| 5,468,447 A | 11/1995 | Bermas |
| 5,489,399 A | 2/1996 | Koyakumaru et al. |
| 5,492,705 A | 2/1996 | Porchia et al. |
| 5,743,942 A | 4/1998 | Shelley et al. |
| 5,820,955 A | 10/1998 | Brander |
| 5,837,358 A | 11/1998 | Bauer et al. |
| 5,839,572 A | 11/1998 | Yeager |
| 5,935,304 A | 8/1999 | Shelley et al. |
| 5,941,052 A | 8/1999 | Evangelisti |
| 5,945,152 A | 8/1999 | Purser |
| 6,106,755 A | 8/2000 | Pfoertner |
| 6,152,295 A | 11/2000 | Brander et al. |
| 6,156,020 A | 12/2000 | Roe et al. |
| 6,171,695 B1 | 1/2001 | Fontenot et al. |
| 6,209,289 B1 | 4/2001 | Cullen et al. |
| 6,217,701 B1 | 4/2001 | Shelley et al. |
| 6,278,371 B1 | 8/2001 | Hopkins |
| 6,340,654 B1 | 1/2002 | Iijima |
| 6,350,710 B1 | 2/2002 | Jonas et al. |
| 6,376,034 B1 | 4/2002 | Brander |
| 6,447,826 B1 | 9/2002 | Matthews |
| 6,478,147 B1 | 11/2002 | Brander et al. |
| 6,579,595 B2 | 6/2003 | Lemaire |
| 6,592,919 B1 | 7/2003 | Matthews et al. |
| 6,695,138 B1 | 2/2004 | Colombo et al. |
| 6,713,152 B2 | 3/2004 | Chen et al. |
| 6,823,774 B2 | 11/2004 | Uranaka et al. |
| 6,890,373 B2 | 5/2005 | Nemoto et al. |
| 6,926,862 B2 | 8/2005 | Fontenot et al. |
| 6,936,342 B2 | 8/2005 | Shibata et al. |
| 6,966,436 B2 | 11/2005 | Baldwin, Jr. et al. |
| 6,979,485 B2 | 12/2005 | Price et al. |
| 6,986,931 B2 | 1/2006 | Ackerman et al. |
| 6,991,844 B2 | 1/2006 | Leboeuf et al. |
| 7,022,395 B2 | 4/2006 | Ackerman et al. |
| 7,025,198 B2 | 4/2006 | Bekele et al. |
| 7,026,034 B2 | 4/2006 | Leboeuf et al. |
| 7,056,569 B2 | 6/2006 | Price et al. |
| 7,063,879 B2 | 6/2006 | Trent et al. |
| 7,063,880 B2 | 6/2006 | Karul |
| 7,078,088 B2 | 7/2006 | Price et al. |
| 7,165,306 B2 | 1/2007 | Bezek et al. |
| 7,189,666 B2 | 3/2007 | Finnegan et al. |
| 7,306,094 B2 | 12/2007 | Baldwin, Jr. et al. |
| 7,320,742 B2 | 1/2008 | Oneill et al. |
| 7,365,034 B2 | 4/2008 | Boehmer et al. |
| 7,585,530 B2 | 9/2009 | Etchells et al. |
| 7,732,036 B2 | 6/2010 | Etchells |
| 7,771,812 B2 | 8/2010 | Beu et al. |
| 7,799,361 B2 | 9/2010 | Etchells et al. |
| 8,414,997 B2 | 4/2013 | Schmidt |
| 9,028,899 B2 | 5/2015 | Etchells et al. |
| 9,056,446 B2 | 6/2015 | Versteylen et al. |
| 9,198,457 B2 | 12/2015 | Versteylen et al. |
| 10,882,295 B2 | 1/2021 | Riehle et al. |
| 2002/0131987 A1 | 9/2002 | Carnazzo |
| 2003/0049410 A1 | 3/2003 | Munagavalasa et al. |
| 2004/0131736 A1 | 7/2004 | Pan et al. |
| 2004/0247750 A1 | 12/2004 | Finnegan et al. |
| 2005/0008737 A1 | 1/2005 | Kwon |
| 2006/0006076 A1 | 1/2006 | Retzner |
| 2006/0029771 A1 | 2/2006 | Oneill et al. |
| 2006/0093788 A1 | 5/2006 | Behm et al. |
| 2006/0144811 A1 | 7/2006 | Cheng |
| 2006/0172048 A1 | 8/2006 | Etchells et al. |
| 2006/0219578 A1 | 10/2006 | Owensby |
| 2006/0228449 A1 | 10/2006 | Tewari |
| 2007/0048415 A1 | 3/2007 | Etchells et al. |
| 2007/0066170 A1 | 3/2007 | Finnegan et al. |
| 2007/0292568 A1 | 12/2007 | Kaufman et al. |
| 2008/0199577 A1 | 8/2008 | Jensen et al. |
| 2010/0047405 A1 | 2/2010 | Versteylen et al. |
| 2011/0127327 A1 | 6/2011 | Jensen |
| 2011/0165294 A1 | 7/2011 | Versteylen et al. |
| 2011/0318460 A1 | 12/2011 | Jensen et al. |
| 2012/0003372 A1 | 1/2012 | Versteylen et al. |
| 2013/0074402 A1 | 3/2013 | Versteylen et al. |
| 2013/0095215 A1 | 4/2013 | Jensen et al. |
| 2013/0243912 A1 | 9/2013 | Beu et al. |
| 2015/0203272 A1 | 7/2015 | Versteylen |
| 2016/0198727 A1 | 7/2016 | Jensen et al. |
| 2019/0275781 A1 | 9/2019 | Riehle et al. |

FOREIGN PATENT DOCUMENTS

| | | |
|---|---|---|
| WO | 2006078868 A2 | 7/2006 |
| WO | 2007067240 A1 | 6/2007 |
| WO | 2011143564 A1 | 11/2011 |

OTHER PUBLICATIONS

"Magnesium Carbonate," National Center for Biotechnology Information. PubChem Compound Database; CID=11029, https://pubchem.ncbi.nlm.nih.gov/compound/11029 (accessed Nov. 16, 2016).

"Definition of Area", Oxford English Dictionary; available at http://www.oed.com/view/Entry/10505?redirectedFrom=area&print; accessed on Jul. 29, 2014.

Examination report dated Apr. 24, 2015 in connection with European Patent Application No. 09718152.3, 4 pages.

Extended European Search Report dated Feb. 15, 2013 in connection with European Patent Application No. 097181152.3, 8 pages.

Mairi, Robinson et al., "Definition of Separate", Chambers 21st Century Dictionary Eds. Longdon: Chambers Harrap, 2001.

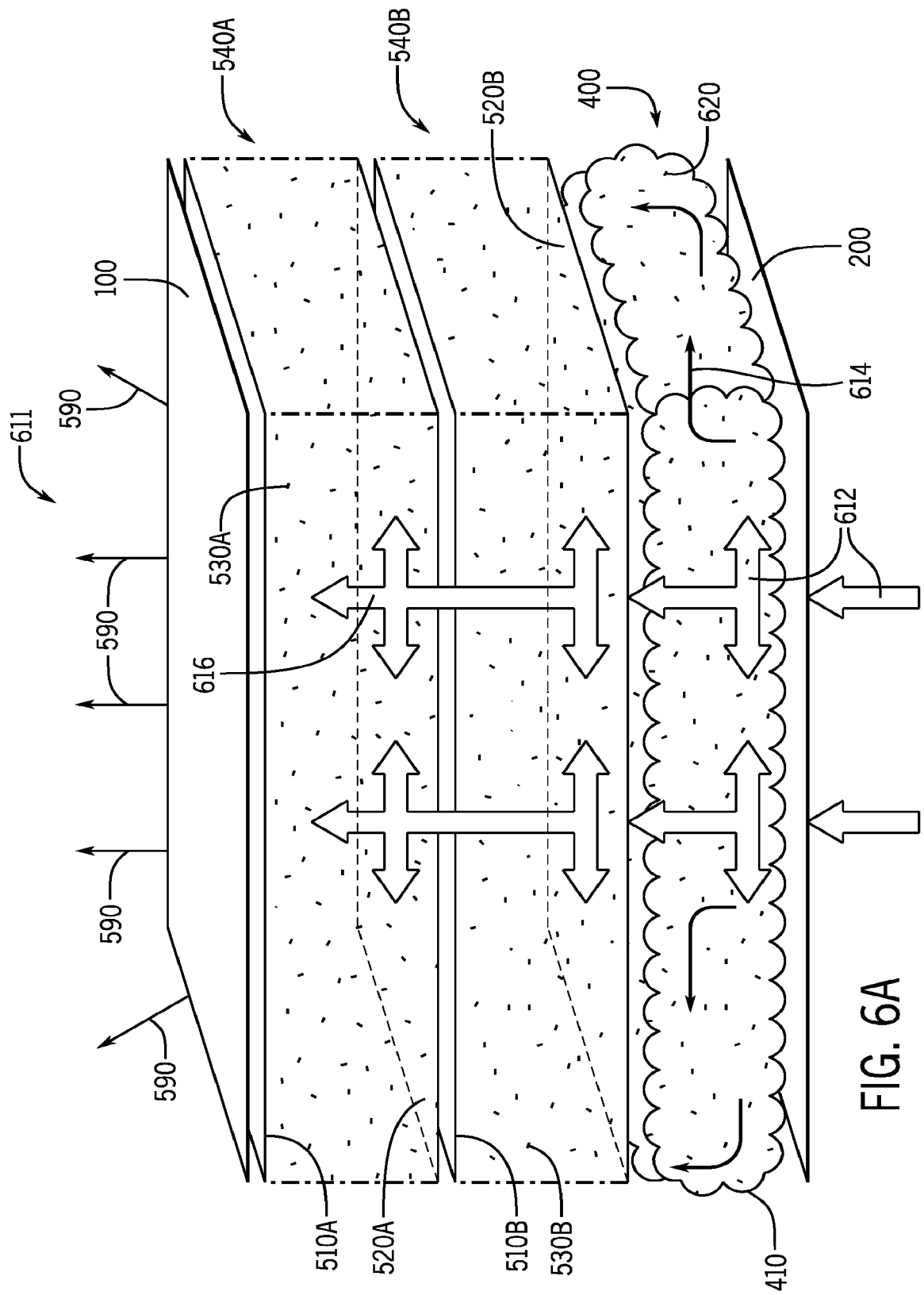

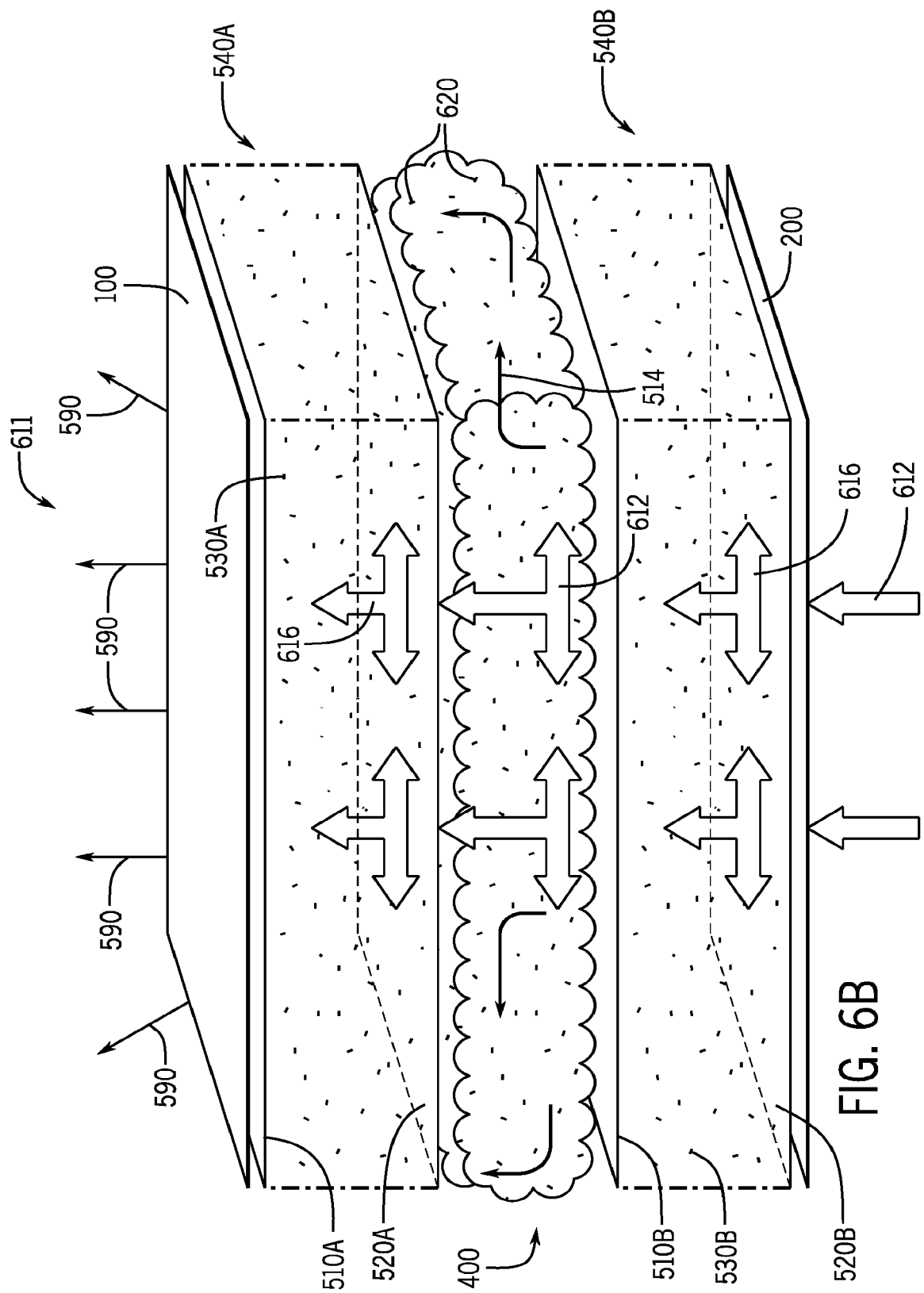

ABSORBENT FLUFF AND TISSUE LAMINATE PADS FOR FOOD PACKAGING

CROSS-REFERENCE TO RELATED APPLICATION

This application is a continuation of U.S. patent application Ser. No. 15/952,879, filed Apr. 13, 2018, which issued Jan. 5, 2021 as U.S. Pat. No. 10,882,295, which claims priority to U.S. Provisional Patent Application No. 62/641,048, filed Mar. 9, 2018, entitled "Absorbent Fluff and Tissue Laminate Pads for Food Packaging," each of which is incorporated by reference herein, in the entirety and for all purposes.

FIELD

The present disclosure describes more effective food packaging with multi-layer absorbent pads that utilize the benefits of carbon dioxide generation systems or other chemical actives embedded in the pad and include a fluff layer made from wood pulp for liquid absorption and other features to improve control of the environment within fresh food packages over an expected package life.

BACKGROUND

Fresh meat, poultry, seafood and produce are frequently packaged in a manner that contributes to maintaining their best quality. To achieve the higher levels of quality, manufacturers of food packaging products constantly look for ways to address the common contributors to spoiled food, such as: excess liquid, microbial growth, rancid odors, and poor seal protection.

Preservation of fresh food products may involve slowing microbiological growth, enzymatic activity, biochemical deterioration, and moisture loss. These may be achieved in part by reduction of product temperature to near the freezing point. However, chilling alone has a limited effect on preservation of fresh food products. Another strategy may be the control of liquids. Absorbent pads may be made of an absorbent core, layered with polyethylene, polypropylene, or non-woven materials (e.g., polyolefin, polyester, or polyamide). The non-woven may be polyethylene, polypropylene, polyester, or any combinations thereof. Absorbent pad layers may be enhanced with chemical systems which may deliver agents to the product or the packaging environment. When these systems target color change, microbial growth, and other food degradation sources, they may be more effective in protecting the packaged food from these susceptibilities.

Among other enhancements is the control of gases in the package environment as in modified atmosphere packaging. Removal or reduction of oxygen slows growth of aerobic microorganisms indigenous to fresh or minimally processed foods, lipid oxidation leading to off odors, and pigment oxidation leading to color changes and aerobic respiration reactions.

Some prior art packages use carbon dioxide generation systems to influence the internal atmosphere of a package. Elevation of carbon dioxide in the tissue of food products retards both microbiological growth and some enzymatic activity. Because of dissolution of carbon dioxide gas in muscle, fat and other tissue or mass of packaged foods, and permeation and transmission of the gas through package structures (such as a transparent film cover layer), concentration of this gas in equilibrium with the food is often decreased below the optimum or even effective level. This may mean that a generated carbon dioxide atmosphere may not be provided at the desired concentration for the full expected product packaging life. The seller or the purchaser may experience a shorter product storage life than desired.

Antimicrobials or chemicals that destroy or control growth of microorganisms may be incorporated into the food or on the food surface, or transferred to the food surface or interior from package structures.

In recent years, modified atmosphere packaging (MAP) has been increasingly applied for red meat, poultry and fresh cut produce to extend chilled shelf life. Similarly, in recent years, significant quantities of fresh red meat have been centrally packaged into case-ready form, most often employing a variant of MAP. On the other hand, most intact cuts of fresh beef and about half of ground beef continue to be packaged in retail grocery back rooms.

One prior art example of an absorbent pad used for food preservation using MAP or traditional tray overwrap is U.S. Pat. No. 9,198,457, which forms pouches between layers of the pad to hold active chemical agents in the package. That pad discloses a layered pad structure with a CO2 generation system. It uses the structure and order of individual layers of absorbent material to absorb liquid purge from the packaged product and location in the pad of the active agents used for CO2 generation to affect the performance of the packaging for CO2 generation over time. For example, the individual components of a CO2 generation system can be separated by separate pockets formed between different absorbent tissue layers in the structure of the absorbent pad, to be activated at different times and thereby enhance food preservation over an extended package life. U.S. Pat. No. 9,198,457 also discloses that liquid purge that enters at the bottom of a pad soaks upward through the pad into other layers that may define the pockets of the active agents used in CO2 generation and that a superabsorbent membrane layer can be used as a separating layer to delay passage of liquid purge from one layer to another. This delay may be used to control the timing of CO2 generation.

Another prior art example of an absorbent pad used for food preservation appears in US Pub. No. 2016/0198727, which discloses another approach to generating and maintaining a desired CO2 atmosphere. Like U.S. Pat. No. 9,198,457, US Pub. No. 2016/0198727 makes use of separation of components used in CO2 generation. It discloses the use of a permeable bottom layer as a primary entry surface for liquid purge and that the qualities of the absorbent layer(s) may affect the diffusion of the liquid purge within the pad once the purge enters. It also considers and suggests the selection of the solubility and strength of chemical components placed in layers and used in CO2 generation to determine how fast a chemical will go into a solution and effects on reaction rate when one dissolved chemical component later encounters a second component used in a CO2 generation reaction. This disclosure also contemplates use of superabsorbents in the form of a membrane layer, such as a superabsorbent polymer (SAP) laminate. Examples of suitable absorbent materials disclosed include, but are not limited to, superabsorbent polymer, compressed SAP composite of superabsorbent polymer granules adhered with one or more binders and/or plasticizers, compressed composite containing a percentage of short or microfiber materials, thermoplastic polymer fibers, thermoplastic polymer granules, cellulose powders, cellulose gels, an airlaid with superabsorbent, any fibrous or foam structure that has been coated or impregnated with a superabsorbent, absorbent structure having one or more starch or cellulose based absorbents, absorbent structure containing superabsorbent material formed and/or cross-linked in-situ, or any combinations thereof.

The present pad offers improvements over these and other known absorbent pads. By extending the shelf life of food products, it provides an opportunity to reduce waste of perishable foods.

SUMMARY

The present pad offers a way to obtain high absorbency and retard microbial growth on the surface of or within packaged foods by improving the packaging environment of fresh foods. This disclosure describes an absorbent pad with an architecture comprising at least four layers of material. The first layer may be permeable or non-permeable, and the second layer, placed on the opposite side from the first, may be the same as the first layer or be different, to serve a different function. Between the first and second layers, the third and fourth layers are positioned, where the third layer is composed of two or more tissue plies in a tissue laminate, and the fourth layer is of fluff made from wood pulp. The tissue laminate of the third layer has chemicals and/or a chemical system distributed at a defined per unit area rate within the tissue plies laminated. The fourth layer may have an additional chemical or chemical system embedded in it. The tissue laminate layer may be associated and/or mechanically joined with the fluff layer to serve as a substrate for the fluff during manufacturing and in the completed pad.

BRIEF DESCRIPTION OF THE DRAWINGS

The above-described properties, features and advantages of this invention and the way in which they are achieved will become clearer and more clearly understood in association with the following description of the exemplary embodiments, which are explained in greater detail in association with the drawings, in the form of schematic illustrations in each case:

FIG. 6A shows a schematic, pictorial and cross-section diagram of the layers in an absorbent pad as in FIG. 5, where the third (tissue laminate) layer is formed by two tissue laminate layers stacked, one on top of the other.

FIG. 6B shows a variant of the absorbent pad as in FIG. 6A with two tissue laminate layers separated by a fluff layer.

DETAILED DESCRIPTION

Overall Absorbent Pad

Figure 1:
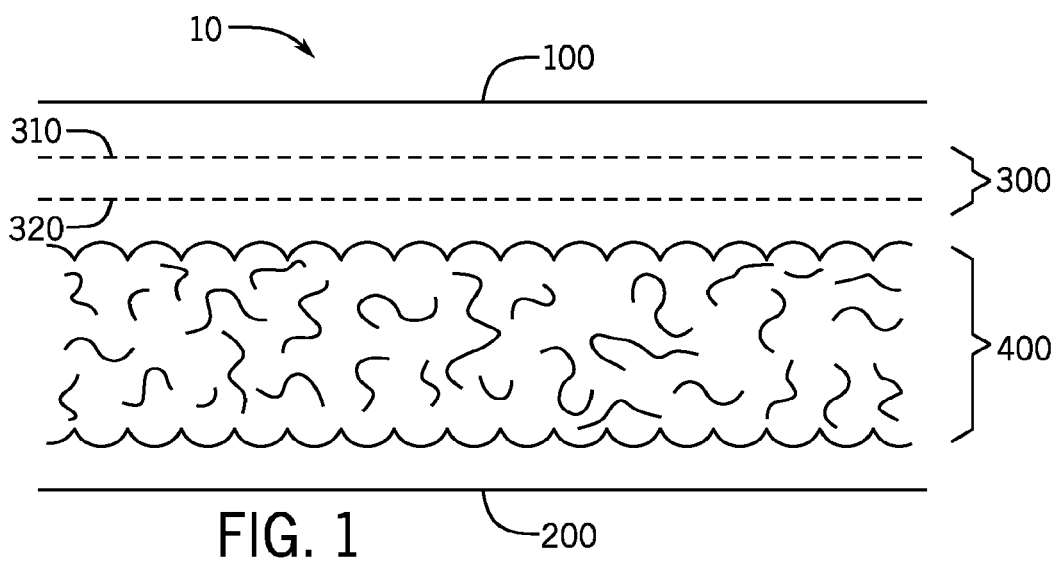
FIG. 1 shows a schematic, cross-section diagram of the layers in an absorbent pad, where the first layer is at the top, making the contact with the food product, the second layer is at the bottom (normally in contact with a container), and the third and fourth layers (one of which is a tissue laminate) are positioned between the first and second.
Figure 1A:
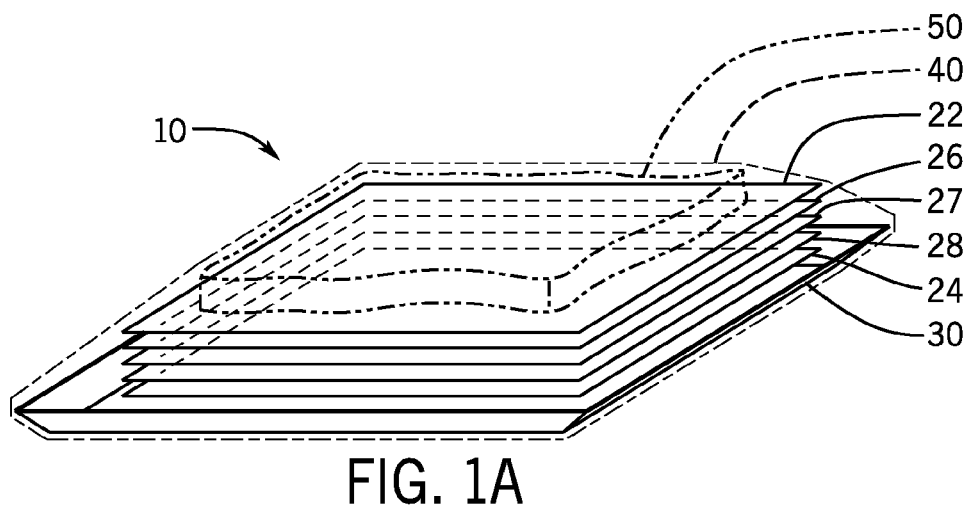
FIG. 1A shows a schematic, pictorial diagram of an absorbent pad with multiple layers (with layer separation expanded to aid depiction), enclosed in a package that includes a tray and an overwrap film that defines a package atmosphere.

The absorbent pad discussed in this application is shown in one typical packaging use situation in FIG. 1A. As seen in FIG. 1A, the pad 10 is shown schematically and in an exploded view, for convenience in identifying individual layers in the pad structure. The absorbent pad 10 comprises multiple layers and is used in a tray or other container 30, which may support a food item 50 (shown in phantom). The food is typically placed on the pad 10, which in turn is placed on the tray 30). The absorbent pad 10 as shown includes multiple layers: a top layer 22 and a bottom layer 24, with at least one laminated tissue layer (which may be formed from the lamination of two plies/layers 26 and 27 or plies/layers 27 and 28). Finally, there is a fluff layer made from wood pulp (which may be layer 28 or layer 26, depending on positioning of the laminated tissue layer). An outer film layer 40 is used as an overwrap of the tray 30, absorbent pad 10 and food item. The protective packaging effects of the pad 10 may be delivered: directly to an adjacent surface of the food item; into liquids that are exuded from the food item and absorbed into the pad 10 or that are not captured in the pad 10 but remain in the package; or into the atmosphere around the pad 10 and food item defined by the outer film layer 40.

Turning to FIG. 1, the absorbent pad 10 presented in this disclosure comprises internally at least one tissue laminate layer 300, comprising at least two cellulose tissue plies 310, 320 or similar absorbent-based material, e.g., cotton-based material sheet, with the adjacent plies defining a volume for chemical loading. The first and second layers 100, 200 in FIG. 1 represent the top and bottom of the absorbent pad, where the order of the first layer 100 and second layer 200 is interchangeable in use in a package. For instance, the first layer 100 may be the top layer (as seen in FIG. 1A or 1) and for contact with a food product, with the second layer 200 being the bottom layer, normally in contact with a tray or other container. However, the pad 10 may be inverted; i.e., the first layer 100 may be used as the bottom layer for contact with a container, with the second layer 200 being the top layer, used for contact with a food product. Between the first and second layers are positioned the third layer 300 and fourth layer 400, as shown in FIG. 1. The third layer 300 comprises the at least one tissue laminate layer, which may incorporate a chemical system or agent, while the fourth layer 400 consists of fluff. The third layer 300 may serve as a substrate for the fourth layer 400 during manufacturing and also in a completed pad. This fourth layer 400 plays a primary absorbent role but may also contain a chemical system or agent that may work together with or separately from the chemicals described in the tissue laminate layers of the previously mentioned third layer 300. The third and fourth layers 300, 400 are the core of the absorbent facility of the pad 10. This absorbency makes them suitable also to carry one or more chemical systems or agents, which may be liquid activated and exhibit carbon dioxide generation, super absorption, ethylene scavenging or inhibiting, oxygen scavenging, antimicrobial properties or other useful functions in combination with liquid absorption in food packaging.

It is desirable in controlling a chemical reaction used in enhancing packaging to coordinate the structure and action of the absorbent pad 10 with the associated chemical components, i.e., the active ingredients used in the pad 10. These components typically are selected to be inactive or largely inactive when not in solution; as they are exposed to liquids that escape from the packaged food, their activity may be triggered. Thus, control of chemical activity may involve keeping added chemical components out of solution, for some period of the package life then selectively wetting them and initiating the planned reaction. For example, in a CO2 generating system, there is typically an acid component and a basic component, each of which starts out in granular form and needs to be put into solution. Flow of dissolved agents in or between layers may also be part of bringing together the acid and base components, when their granular (largely dry) forms are separated in the pad structure. So both the step of putting agents into solution and bringing together the dissolved agents present opportunities to control the reaction rate leading to CO2 generation.

The absorbent core material used in a layer and designed to either control exuded liquid by absorption and/or control liquid interaction with a chemical system or agent may comprise any material suitable for absorbing liquids, particularly food-product liquids. In the pad disclosed, fluff made from wood pulp, which is known as a good absorbent medium in other situations, is used. The fluff can be treated with a superabsorbent material, to increase its natural absorbent properties. A primary issue with fluff is that in relatively thin layers it is not suitable for many high-speed sheet or roll manufacturing processes, such as are typically used for absorbent pad manufacture. Fluff won't easily cut without the tissue laminate layer to carry it through a knife station. Most, and particularly thicker, fluff mats without a substrate will compress at the knife section rather than be cut. It has been found in the present design that use of a tissue laminate layer, as opposed to a typical carrier sheet, helps to carry the associated fluff through the manufacturing process, in particular through a knife station where slitting occurs, while also providing the added opportunity to introduce various chemical agents or systems in a uniform and controlled manner.

With this overview, the nature of each layer combined for the present disclosure is described next.

Layer 1. The first layer 100 of the claimed pad, as shown in FIG. 1, is made from a film (permeable or non-permeable) that, in one embodiment, comes into direct contact with a food product to be packaged. This layer may be impermeable to aqueous fluids that escape or exude from the food product, such as water, saline, seawater, juices or blood. In some embodiments, the first layer 100 comprises an impermeable film. It may be impermeable to moisture. It may comprise, consist essentially of, or consist of polyethylene film in a thickness from 0.5 to 3 mil. The first layer may also consist essentially of, or consists of polypropylene film in a thickness from 0.5 to 3 mil. In other embodiments, the first layer comprises, consists essentially of, or consists of polyester or a permeable material such as a non-woven material (e.g., of one or more of: polypropylene, rayon, polyolefin, polyethylene, and/or polyester). The top or bottom layers may also be made of wet strength cellulose material. In some embodiments, the permeable material of the first layer comprises a nonwoven material in a weight from 15 to 50 GSM. This nonwoven material may include a hydrophilic surface treatment to make the non-woven material more permeable to liquids, particular aqueous liquids. Examples of suitable hydrophilic surfactants include surfactants (polyolefins), surface oxidation, electrostatics, plasma treatments, fatty acids, or other cationic, anionic, amphoteric, nonionic surfactants. Permeability of an outer layer of the pad makes it an easy surface through which an exuded liquid can enter the pad. In addition to surfactants, perforations can be used to increase layer permeability to exuded liquids.

Layer 2. The second layer 200, as seen in FIG. 1, is also made from a film (permeable or non-permeable) that can be the same as or different from the film used in the first layer. In one embodiment, the second layer is for contact with a tray or other container. In some embodiments, the second layer is permeable or substantially permeable to aqueous fluids that escape from the food product, such as water, saline, seawater, juices or blood. In some embodiments, the second layer comprises, consists essentially of, or consists of a nonwoven film. As used herein, the term "nonwoven film" refers to a substantially flat, porous sheet made from fibers or molten plastic/plastic film (e.g., without converting the fibers or molten plastic/plastic film into thread or yarn) in a weight from 15 to 50 GSM. In some embodiments, the film comprises, consists essentially of, or consists of one or more of: polypropylene, rayon, polyolefin, polyethylene, and/or polyester in a thickness from 0.5 to 3 mil. In some embodiments, the second layer comprises, consists essentially of, or consists of a non-permeable material including a plurality of one-way fluid valves, which may be in the form of perforations formed by a pin wheel or other suitable means. The second layer may also be a wet strength cellulose material.

Layer 3—Tissue Laminate. As seen in FIG. 1, the third layer 300 may be positioned between the first layer 100 and the second 200. It may comprise a cellulose tissue laminate. The lamination of the layers may in one embodiment be formed by adhesive/glue ply bonding. Food grades adhesives are used, such as thermoplastic hotmelt, water based pressure sensitive adhesives, polymeric adhesives, or metallocene adhesives available from Henkel, HB Fuller, Bostik or Savare.

Figure 2:
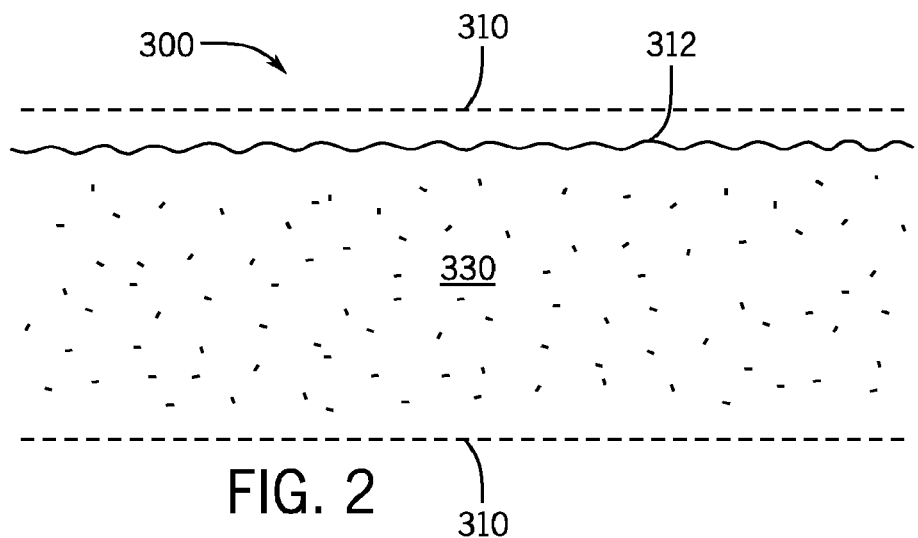
FIG. 2 shows a schematic, cross-section diagram of a tissue laminate layer with a chemical agent or a chemical system distributed in the layer.

This laminate 300, as seen in FIG. 2, may comprise a first tissue layer or ply 310 and a second tissue layer or ply 320, which between their adjacent surfaces may contain one or more chemicals comprising a chemical system or agent 330. The chemical system or agent 330, as shown in FIG. 2, may be distributed in a volume formed by lamination of the plies, which may increase the bulk of the two tissue plies, and may be a system or agent of various kinds found useful for improving product shelf life. It is preferred that the position of any chemical systems or agents in the laminate be stable or fixed, such that any particles embodying the chemical systems or agents do not migrate significantly from their positions as placed in the laminate 300. This may be accomplished in whole or in part by the embossing and/or pressure employed for lamination. It may also be accomplished by glues or adhesives that fix the added particles or by applying an agent in liquid form to a tissue or to laminated tissues and allowing it to be absorbed, with or without drying. Alternatively, an optional adhesive layer 312 applied, for example, to tissue layer 310 or mixed with the agent 330, may help hold the agent 330 in place. In one embodiment, the system or agent 330 may comprise: an antimicrobial (e.g., citric acid and sorbic acids mixed in about a 64.5:35.5 ratio or $ClO_2$, molecular iodine, Ag based systems, or Cu based systems; carbon dioxide generating chemicals consisting of acid and base in ratio of about 43/57; or an ethylene scavenger or inhibitor. Further details of the chemical systems or agents in a tissue laminate 300 are discussed below. These can be in any combination and are typically separate from any chemical systems that may be placed in layer 4, the fluff layer 400 in FIG. 1.

Figure 3:
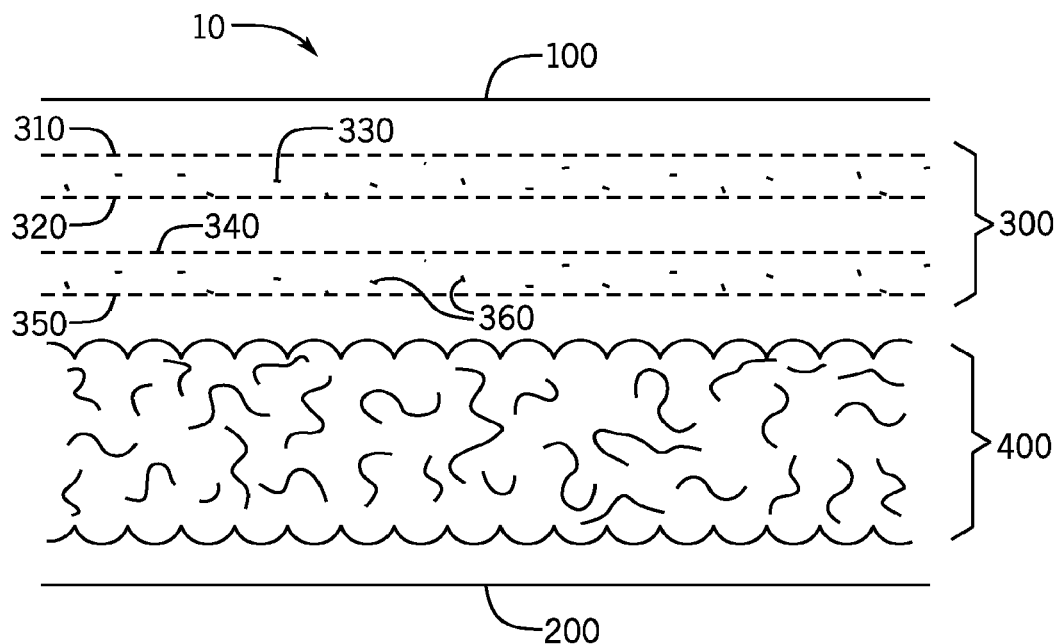
FIG. 3 shows a schematic, cross-section diagram of a pad containing chemically active layers, arranged as the third and fourth layers, one of which is a tissue laminate layer; here, two adjacent tissue laminate layers are shown.

Tissue laminate layer 300 may comprise more than two plies or layers of tissue laminated together, as depicted in FIG. 3. In the embodiment of FIG. 3, a first pair of laminated tissue plies 310, 320 fixed with first chemical agent or system 330 is further laminated with a second pair of laminated tissue plies 340, 350 with second chemical agent or system 360, placed between the additional plies 340, 350. This allows a chemical system to be separated into two components that have little or no contact until liquid in one or both of the components dissolves one or both and the dissolved components flowing together activates their reaction. (As discussed below, stronger separation for controlling dissolution can be effected with a fluff layer between two tissue laminates.) The first and second pairs of laminated tissue plies also allows a chemical system to be duplicated to increase its effect in one time interval, or where liquid that activates the systems is controlled to delay its entry into one chemical system or the other of two tissue laminates with spatial separation or separation by a fluff layer, to provide the same chemical effect at a different, later time. The first and second chemical agents or systems 330, 360 also may be different and provide two different chemical effects. Again, where liquid that activates the systems is controlled as to the time it contacts the first and second chemical systems 330, 360, the two different chemical effects may be provided at the same time, at different but overlapping time periods or at separate and different time periods. As with the first pair of laminated tissue plies 310, 320 with first chemical system 330, the particles or other material comprising the chemical system or agent may be made stable or fixed in tissue plies 340, 350 by methods described above.

Each tissue laminate 310, 320 or 340, 350 is preferably a part of the absorbent core body of the pad 10, combining tissue layers with absorbent capacity and/or other absorbent material, such as the SAP, discussed above. In most applications, a tissue laminate cannot be the entire absorbent body. In one embodiment, the laminate is made of one or more plies or layers of light or heavy weight crepe wadding material with a glue or an adhesive or other binder between layers. Heavy crepe tissue has a crepe percentage of about 70%, mid-grade is about 40-50% and flat grade is less than about 10%. Examples of suitable glues or adhesives for a cellulosic tissue laminate include thermoplastic hotmelt, water based pressure sensitive adhesives, polymeric adhesives, or metallocene adhesives available from Henkel, HB Fuller, Bostik or Savare. In an exemplary embodiment of absorbent pad of the present disclosure, the laminate 300 is a mixture of cellulosic material and one chemical agent or system based on the specific application for the pad.

A tissue laminate offers several advantages for an absorbent pad that also carries a chemical system or agent. First, a laminate can incorporate large amounts of an active agent in a relatively thin structure (using, if needed, optional adhesive (e.g., FIG. 2, at 312) or other fixing methods described above), while avoiding the disadvantages of having large amounts of dry, loose chemicals in a pad that can cause an absorbent pad to "bulge" and/or have active agents that collect disproportionately in one portion of the absorbent pad when the absorbent pad is picked up by one edge or subjected to vibrations and/or orientations that disrupt an initial uniform distribution of loose chemical particles. Second, because an active agent or system can by a metering roller, metered spray or other controllable dispersion means be uniformly distributed at a desired rate per square unit of area in a laminate and held in place with an adhesive, or other fixing methods, if needed, selecting a prescribed distribution area and a defined or predetermined distribution rate per unit area and selecting a number of plies of the laminate permits the total amount of active agent to be determined with accuracy on a per unit of laminate area basis. Further, the position of the active agents remains predictable after their placement. In effect, the laminate becomes one tool for metering the desired amount of chemical activity capacity into a layer and pad and controlling the interaction of chemical agents or of the agents dissolved in an aqueous liquid used to activate them. (The adjacent layers may provide a second tool to control the flow of aqueous liquids within the pad structure.) An exemplary embodiment of laminate use in a pad is a cellulosic tissue material and $CO_2$ generating components plus an antimicrobial that is uniformly distributed therein to form one or more plies of the laminate. Such an embodiment is effective to inhibit bacterial growth within the pad structure and generate $CO_2$ gas to inhibit bacterial growth on the surface of the meat by interfering with bacteria reproduction and biochemical pathways. Assuming adequate liquid for activation delivered by flows into the pad and between layers, the deposited chemical system will perform its function over the entire area where it was placed and fixed in the laminate. Where a two-component system is separated in two layers, a designed coordination or complementarity of the two layers can be effected and maintained by precise metering and placement of components in a laminate. For example, a selected amount of a component in one layer can be fixed in location relative to a designated amount of a paired component in an adjacent layer or coordinated to expected liquid flow or absorption in a layer. This may help reduce the amount of chemicals left unreacted or not used for their intended purpose in a pad structure.

The two tissue layers 310, 320 shown in FIG. 2 may have chemicals embedded in and/or between them by the methods described above. In one embodiment, these laminates are constructed using 2 plies of flat grade, or similar grade, tissue in the range of 14-20 lb./3000 ft^2 sheet). The layered, laminated tissue, described previously, may take the form of one or more laminated layers, each consisting of two of more tissue plies. The tissue layers may be composed of compostable polymers or compostable polymers derived from cellulose or paper-based materials originating from wood fiber, such as cellulose. Tissue layers may take the form of tissue in sheet or roll form for pad manufacturing, with roll being the preferred format. The tissue layers may be bleached or natural (unbleached). Processed tissues such as coffee filter tissue (CFT) may also be used. The tissue laminate layer of a pad will be formed prior to and/or separately from the other layers, so that it is available in a completed form for use as a substrate for the wood pulp fluff layer 400 described next, as it enters a high-speed manufacturing process.

Figure 4:
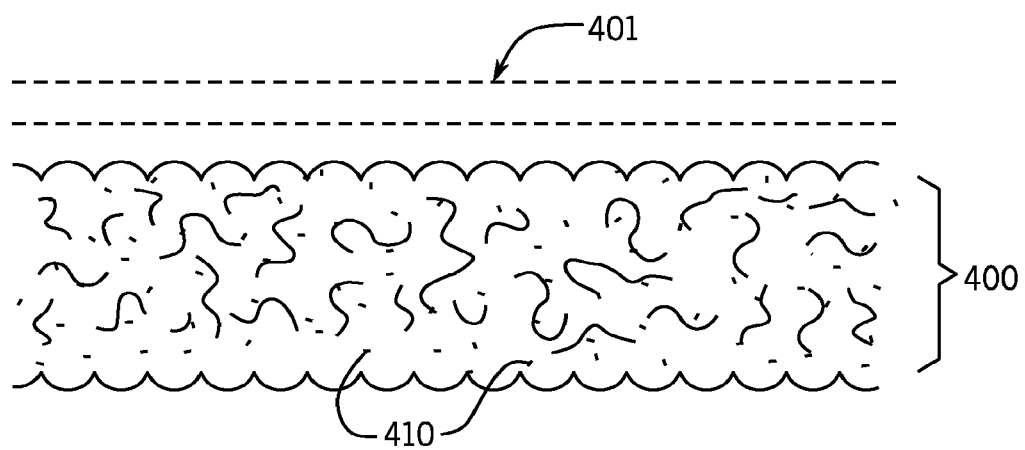
FIG. 4 shows a schematic, cross-section diagram of a fourth layer, made of fluff associated with a tissue-based substrate and, in one embodiment, carrying a chemical system.

Layer 4—Fluff. As seen in FIG. 4, the fourth layer 400 may be of fluff from wood pulp, such as 100% virgin pine pulp available from Georgia Pacific or International Paper. Wood pulp is received in a 1-2 mm thickness sheet. The wood pulp is put in a hammer mill to create fluff to increase pulp absorbency. The final product made from the wood pulp is a fluff web, typically 0.25-3.0 inches in thickness. In the pads described herein, a layer of fluff (processed pulp) 400 is placed adjacent and joined to the tissue laminate layer 300 at an early stage of pad manufacture, so as to form a mechanical bond between the two. This fluff layer comprises, consists essentially of, or consists of fibrous fluff and can be constructed of a combination of fibrous fluff and other materials such as: superabsorbent materials, surfactants, or other active type ingredients. Fluff as used in a pad of the present design provides one or more benefits, including: 1) more consistent absorbency under load than tissue; 2) closer control of the absorbency level by selection of thickness and weight; 3) better moisture distribution (moisture moves in x, y, and z dimensions) than tissue; and 4) better wicking and speed of absorbency. From a processing efficiency standpoint, using fluff reduces water consumption relative to forming tissue as the absorbent.

For purposes of manufacturing a pad 10, it is advantageous to use the tissue laminate layer 300 as a substrate for carrying the fluff into the roll manufacturing process used to form the core and to slit and carry the fluff through the subsequent steps of the pad manufacturing process. A typical wood pulp fluff sheet lacks tensile strength and is easily compressed and thus by itself is not easily handled in manufacturing equipment for making pads. This may be addressed by joining the fluff with a substrate, in one embodiment a tissue laminate as described above, at the time the fluff sheet enters the manufacturing process. For example, a sheet of fluff in roll (web) form may be fed at the same rate as a sheet of tissue laminate in roll form, with the two compressed together at a nip to form a mechanical bond. In one embodiment, the laminate joined with the fluff is made with a light crepe paper in the range of 9-20 lbs./3000 ft$^2$ sheet. The creping may help create a type of mechanical bond, causing the fluff to adhere to the tissue laminate substrate. In the manufacturing process, the substrate or carrier sheet comes in on top of the fluff layer as soon as it is formed as a web at the exit of the hammer mill. Atmospheric humidity or misting may be used at the time of joining the fluff and laminate to enhance the bond. The substrate carries the fluff through the exit of the hammer mill and through the later stations for combining with the webs that form top and bottom layers of a pad. It should be noted that in one embodiment the tissue laminate layer is fully formed, including any chemical loading of the laminate, before it is used as a substrate.

As shown in FIG. 4, the fluff layer 400 may contain one or more additional chemical systems 410, similar to, or the same as, the ones described for tissue laminate layer 300. The chemicals of the chemical systems may be applied to and in the fluff layer 400 by dispersing chemicals into the sheet-forming chamber with wood pulp fibers. The amount of $CO_2$ system or other chemicals added into the fluff will be based on the weight of the fluff in the pad, rather than on the per square unit rate used for tissue laminates (although a fluff sheet itself may be specified by its weight per square unit). For example, a fluff layer may have 0.15% chemical added by weight of fluff up to 50% chemical added by weight of fluff. The amount of fluff used in the pad varies by application, depending on both the absorbency target for the package as well as the chemical loading, which will in some embodiments be a superabsorbent material added to help achieve the absorbency target or provide liquid control. While the tissue laminates have some absorbency, they are used mainly to hold chemicals and transfer liquids to activate chemicals, and they do not add significantly to the absorbency capacity of the pad, above what the fluff layer provides. These fluff-hosted chemical systems may or may not be used in conjunction or coordination with the chemical systems in the laminate layer 300. In effect, like the tissue laminates, the fluff layer may also become a tool for metering the desired amount of chemical activity capacity into a pad.

Providing a chemical system in a fluff layer allows a chemical system also placed in a tissue laminate layer to be duplicated, to increase its effect in one time interval, or where liquid that activates the systems is controlled to delay or accelerate its entry in one chemical system or the other, to provide the same chemical effect at a different, later time. Again, where liquid that activates a chemical system in a fluff layer is controlled as to the time it contacts the first and second chemical systems 330, 360, the two different chemical effects may be provided at the same time, at different but overlapping time periods or as separate and different time periods. Use of a superabsorbent material in one layer, e.g., a fluff layer, increases absorbency in that layer and can be used to control flow of a liquid into a layer that is downstream, based on the structure of a pad and its surfaces for liquid entry. Use of a tissue laminate substrate 401 as further described below makes it possible to use the fluff layer in high speed web manufacturing processes of pads.

Chemical Systems

Many chemical systems or agents can be integrated into the absorbent pad to achieve results of high absorption, lower bacterial growth rates, and better structural integrity of packaged food products. Among those chemical systems are $CO_2$ generating systems, activated carbon or other odor absorbing compounds, antimicrobials, oxygen scavengers, and ethylene scavengers or inhibitors. Examples of how these systems work inside the absorbent pad are given below.

Activated carbon. Activated carbon is a solid, highly porous material that captures, adsorbs and traps volatile organic compounds on its surface. Activated carbon captures organic compounds from gas and liquid streams, and so is commonly used in filters as an economical way to remove organic contaminants from large volumes of air or water. The primary use for activated carbon is treatment of water, including potable water, wastewater, and groundwater remediation. Activated carbon is generally safe for human ingestion, and has been used as an odor-removing, color-removing, and taste-removing agent in food processing.

Activated carbon largely adsorbs, as opposed to absorbs, molecules of organic compounds. Adsorption is a process by which molecules adhere to the surface only. Absorption, by contrast, is analogous to a sponge that soaks up water, in which the absorbed water is fully integrated into the sponge. Activated carbon has a large adsorption-available surface area and pore volume that gives it a unique adsorption capacity. Commercial grade activated carbon for food products has a surface area that ranges between 300 and 2,000 m2/g, with some having surface areas as large as 5,000 m2/g. Activated carbon adsorbs molecules of odor-causing organic compounds, for example, as these compounds "stick" to the surface of the carbon particles along this very large surface area.

Activated carbon captures and adsorbs organic compounds much more readily than it attracts and adsorbs inorganic compounds. Hence, few inorganic compounds are removed by filters that contain activated carbon. Molecular weight, polarity, water-solubility, temperature and concentration affect the capacity of activated carbon to capture a particular compound.

In one exemplary embodiment, the tissue laminate is a combination of cellulosic material, activated carbon, and an antimicrobial. In a preferred embodiment, the antimicrobial is an organic acid or combination of organic acids. The activated carbon or the antimicrobial may be included in a sandwich layer between two tissue plies as seen on FIG. 2 or FIG. 3, or one of both of the activated carbon or antimicrobial may be loaded into a tissue laminate when the tissue laminate is formed. Possible antimicrobials chemicals include organic acids, silver based antimicrobials, and copper based antimicrobials.

CO2 generation. An exemplary embodiment of a CO2 generation system is an acid and a base, such as citric acid and sodium bicarbonate, respectively, that react with each other (when activated by water or other aqueous liquid) to generate CO2 gas. The acid component of the CO2 generation system can be a food safe organic acid (that includes, but is not limited to, citric acid, sorbic acid, lactic acid, ascorbic acid, oxalic acid, tartaric acid, acetic acid, and any combinations thereof) and inorganic acids (such as boric acid). The ratio and amounts of acid and base, as well as their physical placement in the pad architecture, can be varied to control the timing and amount of CO2 released. In one exemplary embodiment, citric acid and sodium bicarbonate are present in an absorbent body (tissue laminate or fluff) in a ratio of about 43:57, e.g., 43% citric acid and 57% sodium bicarbonate, which can be activated by moisture and/or other aqueous food exudates to generate CO2 gas. Citric acid provides an additional benefit by interacting with the sodium ion of sodium bicarbonate to create a citric acid/sodium citrate buffer system that helps maintain a pH that is food-compatible. Other acids can be selected for a CO2 generation system, with amounts and ratios adjusted in accordance with the pKa of the acid.

Ethylene agents. Examples of an ethylene inhibitor or ethylene competitor agents include, but are not limited to, 1-methylcyclopropene, (also called "MCP" or "1-MCP"), its salts and chemical derivatives. The one or more ethylene competitor agents can be selected to bind irreversibly to the ethylene receptors. Additionally, the system can include an ethylene scavenger which adsorbs ethylene given off by the fruit or surroundings. Ethylene promotes ripening and the onset of the mold botrytis.

Oxygen scavengers. In one exemplary embodiment, the absorbent pad has activated carbon and an oxygen scavenging enzyme. The activated carbon and oxygen scavenging enzyme can be disposed in absorbent body, such as a tissue laminate. In a preferred exemplary embodiment, an absorbent pad has activated carbon and the oxygen scavenging enzyme(s) glucose oxidase and/or catalase in various layers. The active carbon would likely work in conjunction with a CO2 generator or an antimicrobial or possibly an oxygen scavenger but be less effective with an ethylene inhibitor and scavenger.

In yet another exemplary embodiment, an absorbent pad has activated carbon, an oxygen scavenging enzyme, and an antimicrobial agent. The activated carbon, oxygen scavenging enzyme, and antimicrobial agent can be disposed in an absorbent body, or in a tissue laminate. In a preferred exemplary embodiment, an absorbent pad has activated carbon, oxygen scavenging enzyme(s) glucose oxidase and/or catalase, and the antimicrobial agent(s) citric acid and/or sorbic acid.

For those embodiments of an absorbent pad having an oxygen scavenger enzyme, the absorbent pad can have additional active agents, like an antimicrobial.

As seen in FIG. 3, each active agent/active system can have its components be positioned in a volume available in an absorbent pad layer that is formed by: any two laminated tissue layers (e.g., layer 3; 300); any tissue layer and an adjacent laminate; topmost tissue layer and top outer layer 100; and/or bottommost tissue layer and bottom outer layer 200. Alternatively, an active agent can be incorporated in one or more plies of a laminate as seen in FIG. 2 or FIG. 3. In one embodiment, each of the two components of a CO2 generation system is placed in a tissue laminate layer, each of which may be formed from two or more tissue plies, joined by an adhesive. In another example, each of the two CO2 chemicals plus an antimicrobial is in a tissue laminate incorporated into a pad containing also a fluff layer with a superabsorbent material dispersed in the fluff. The CO2 chemical system will be at the top of the pad closest to layer 100 in FIG. 3. Fluff with a superabsorbent material may be in layer 400 closest to layer 200. Activation will occur through layer 200 and the superabsorbent material will absorb liquid before activation of the top chemically-loaded tissue laminates can occur. Fluff and a superabsorbent material can be increased for the specific application to add more or less absorbency to increase or decrease activation time.

Figure 5:
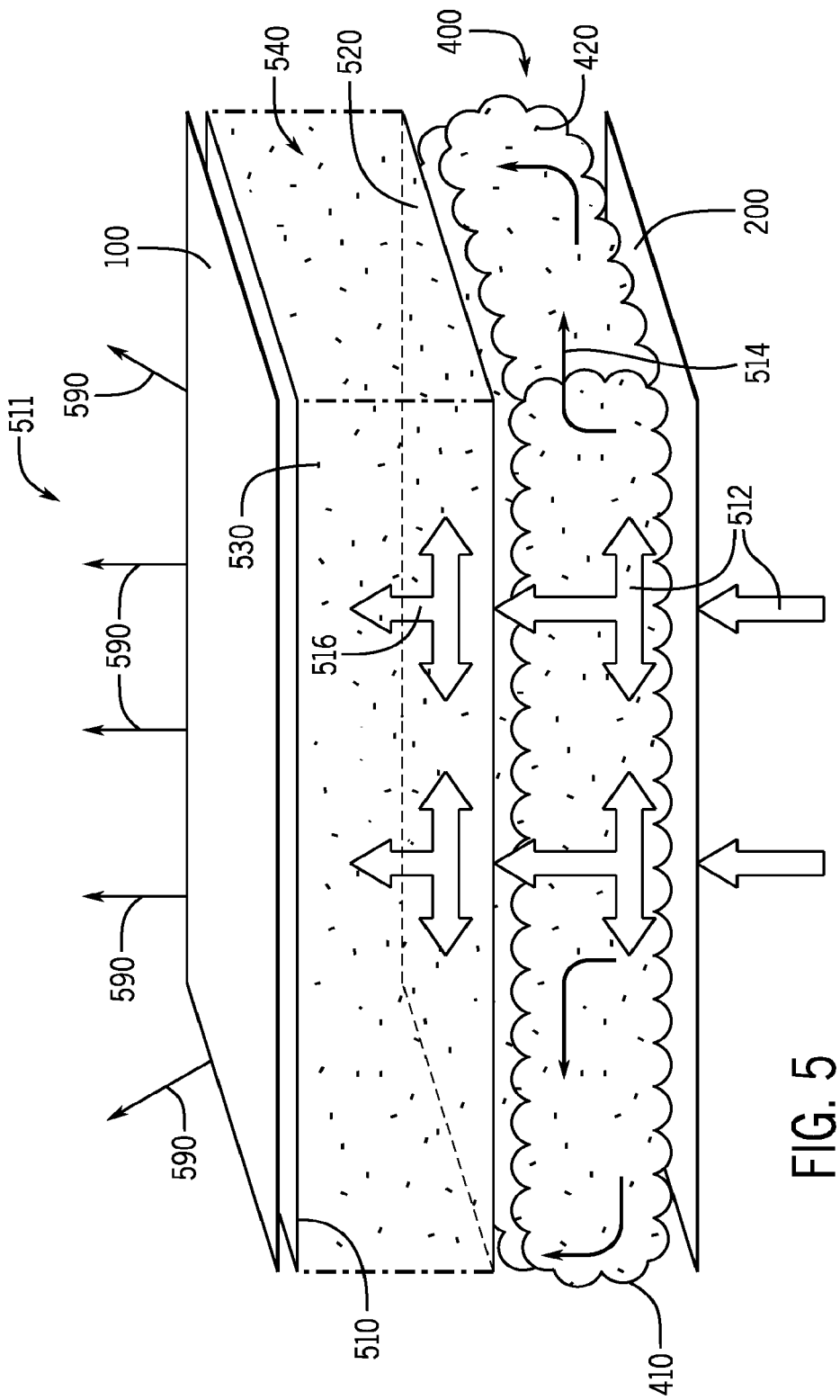
FIG. 5 shows a schematic, pictorial and cross-section diagram of the layers in an absorbent pad (with layer height expanded to aid depiction), where the first layer is at the top, for contact with the food product, the second layer is at the bottom (normally in contact with a container in which exuded liquid gathers), and the third (tissue laminate) and fourth (fluff) layers are positioned between the first and second layers, and further showing flow of exuded liquids to and within layers loaded with two separate components of a chemical system.
Figure 8:
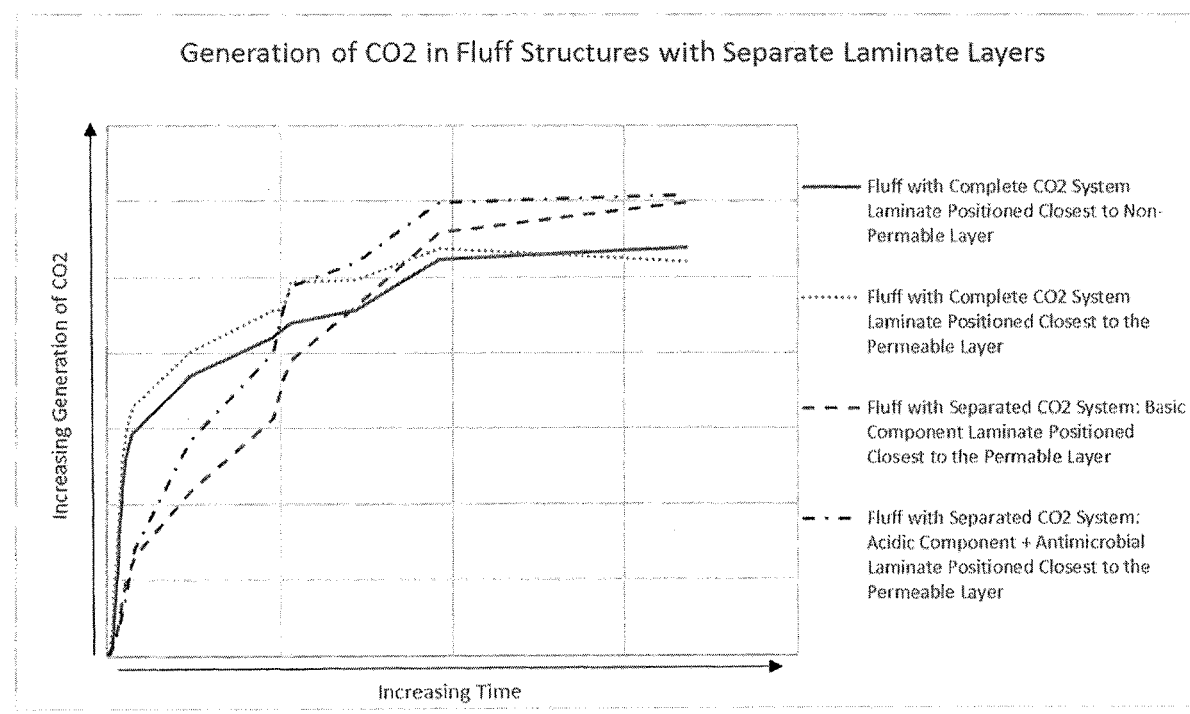
FIG. 8 shows a graph of the results of testing of $CO_2$ generation in pads with a fluff layer and an adjacent laminate layer.

Examples. FIG. 5 shows in schematic form an example of one embodiment of an absorbent pad in which a layered structure is used to control CO2 generation. As seen in FIG. 5, the absorbent pad 511 comprises internally at least one tissue laminate layer 540, comprising at least two cellulose tissue plies 510, 520, with a chemical agent 530 distributed in granular form between the plies 510, 520 and fixed with an adhesive. The first and second layers 100, 200 in FIG. 5 represent the top and bottom outer layers of the absorbent pad 511. These outer layers 100, 200 are as described above in connection with FIG. 1. For instance, the first layer 100 may be the top layer (as seen in FIG. 1) and for contact with a food product, with the second layer 200 being the bottom layer, normally in contact with a tray or other container. Between the first and second layers are positioned the third layer 540 and fourth layer 400, as shown in FIG. 1. The third layer 540 comprises the at least one tissue laminate layer, which may incorporate one component 530 of a chemical system for CO2 generation, while the fourth layer 400 consists of fluff 410 loaded with the other component 420 of a chemical system for CO2 generation. The graph of FIG. 8 shows some test results of ways of placing the chemical agents with a CO2 generating function in a pad with the general structure of FIG. 5 and having one outer layer that is permeable. The tests were compressed, performed over a period of hours shorter than a typical food product package life but long enough and with enough liquid supplied (metered into each structure in defined amounts at defined intervals), identical for each structure) to show $CO_2$ generation behavior. It can be seen that the different structures identified with different lines lead to differentiation of associated $CO_2$ generation curves. These demonstrate that the different structures allow control of the rate of $CO_2$ generation over time and also to some extent the total amount of $CO_2$ generated. The dotted and solid lines in FIG. 8 show the $CO_2$ generation curves for pads with the complete $CO_2$ generation system loaded into the laminate, but with a permeable outer layer closest in one test and a non-permeable outer layer closest in the other test. The dashed line and the dash-dot lines both correspond to structures realizable as in FIG. 5, with a $CO_2$ system separated by placing one component in the fluff and one in the laminate. The different locations of the acidic and basic components lead to even further differentiation of associated $CO_2$ generation curves. Again, the results demonstrate that the variations in chemical loading possible in this pad architecture allow control over $CO_2$ generation, both amount and rate.

Figure 9:
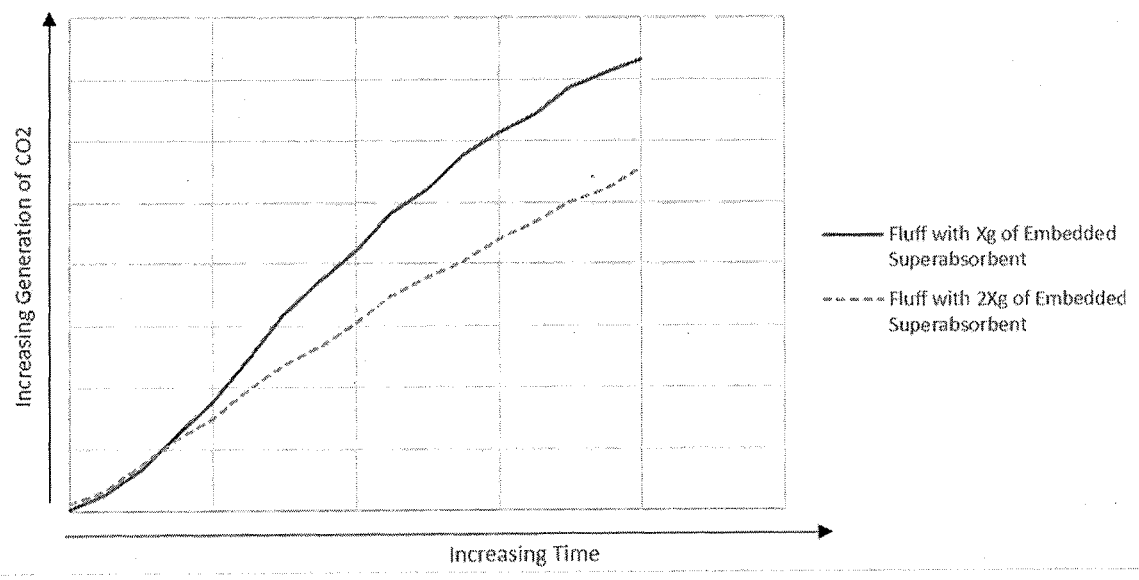
FIG. 9 shows a graph of the results of testing of $CO_2$ generation in pads with an alternative fluff and adjacent laminate layer(s) structure.

FIG. 5 shows only a few symbolic granules of chemical component 530 in the volume between plies 510, 520, which would be occupied by a uniform layer of component 530 with a predetermined distribution rate per unit area and is shown with an exaggerated relative thickness. Similarly, FIG. 5 shows only a few symbolic granules of component 420 in the volume of fluff 410, which would be occupied by a distribution of component 420 in the fluff 410. The third layer 540 (tissue laminate) also serves as a substrate for the fourth layer 400 during manufacturing and in a completed pad. The fourth (fluff) layer 400 plays a primary absorbent role in the pad 511 but may also contain at least one chemical component 420 that may work together with the chemical 530 described in the tissue laminate layer of the previously mentioned third layer 540; e.g., the two generate $CO_2$ when dissolved together. The fourth layer 400 may also be loaded with additional chemicals. For example, it may incorporate super absorbent material to meet an absorbency target or to help retard migration of absorbed liquid into the third layer 540 to delay $CO_2$ generation. The graph of FIG. 9 shows results from use of the same test protocol as the tests for FIG. 8, but here the fluff layer is loaded with two different loading levels of a superabsorbent material. The differing results show that the structure of FIG. 5 combined with varying the loading level of superabsorbent material allows a form of control over $CO_2$ generation curves. This likely is obtained by the superabsorbent material delaying liquid migration. The fourth layer 400 may also incorporate an antimicrobial.

FIG. 5 also shows exuded moisture or liquid entering the pad 511 through bottom layer 200 (flow 512) to disperse (arrow 514) and be absorbed in fluff 410 and to dissolve $CO_2$ component 420. That liquid moves through the fluff 410 to enter and disperse (flow 516) in the tissue laminate layer 540 and bring dissolved $CO_2$ component 420 into contact with the $CO_2$ component 530 distributed throughout laminate layer 540.

The flows of liquid within the pad show the possibility of other control tools for activation of chemical agents and systems possible with the pad architectures disclosed herein. It has been noted that a fluff layer and a tissue layer have somewhat different liquid transport tendencies. Fluff has void spaces and absorbs in the "x" and "y" directions (i.e., in the plane of the fluff layer before it absorbs and transports liquid in the "z" direction. By contrast, tissue absorbs preferentially in the "z" direction (i.e., a direction perpendicular to the plane of the tissue layer) before it transports liquid in the "x" and "y" directions. This also can play a role in chemical component loading strategies for the pad architectures disclosed herein, leading to differentiated $CO_2$ generation curves, which may be more or less suitable for particular applications.

FIG. 6A shows in schematic form another embodiment of an absorbent pad in which a layered structure is used to control $CO_2$ generation. As seen in FIG. 6A, the absorbent pad 611 comprises internally two tissue laminate layers 540A, 540B. Layer 540A comprises at least two cellulose tissue plies 510A, 520A, with a chemical agent 530A distributed in granular form between the plies 510A, 520A and fixed with an adhesive. Similarly, layer 540B comprises at least two cellulose tissue plies 510B, 520B, with a chemical agent 530B distributed in granular form between the plies 510B, 520B and fixed with an adhesive. The first and second layers 100, 200 in FIG. 6, as in FIG. 5 represent the top and bottom outer layers of the absorbent pad 611 and are as described above in connection with FIG. 1. This structure shows how two separate $CO_2$ generating tissue laminates 540A, 540B can be used to place each of the two $CO_2$ generating components in separate tissue laminate layers or to duplicate the chemical potential of one tissue laminate by placing two laminates with duplicated chemical loads adjacent to each other. The fluff layer 400 is not used as part of $CO_2$ generation and can then be loaded with an agent 620, such as super absorbent material, to meet an absorbency target or to help retard migration of absorbed liquid into the tissue laminate layers 540A, 540B to delay $CO_2$ generation longer than the structure of FIG. 5. Layer 400 may also incorporate a dissolvable antimicrobial in place of or in addition to super absorbent material 620.

As can be seen in FIG. 6A, exuded liquid enters the pad 611 through bottom layer 200 (flow 612) to disperse (arrow 614) and be absorbed in fluff 410 and to be absorbed in component 620, if it is super absorbent material, or to dissolve a non-super absorbent material component. That liquid moves through the fluff 410 to enter and disperse (flow 616) in the lower tissue laminate layer 540B then upper tissue laminate layer 540A. This brings dissolved $CO_2$ component 530B into contact with the $CO_2$ component 530A distributed throughout laminate layer 540A. The mixing of dissolved $CO_2$ components 530A, 530B (acid+base) leads to $CO_2$ generation. The $CO_2$ travels through the layer 100, which may be a permeable side of the pad, to deliver $CO_2$ 590 into the package atmosphere above the pad 611.

Figure 10:
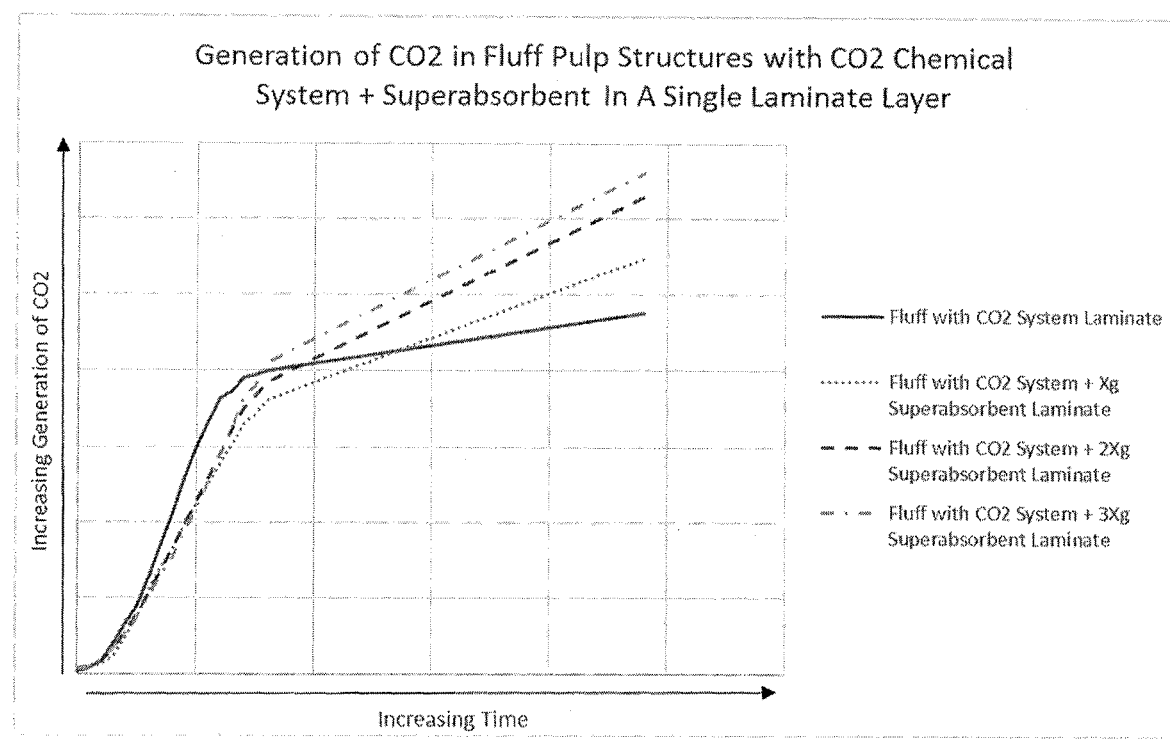
FIG. 10 shows a graph of the results of testing of $CO_2$ generation in pads with alternative fluff layers and adjacent laminate layer(s).

In a structure such as in FIG. 6A, the amounts of $CO_2$ components separately fixed in tissue laminates 540A, 540B can be more precisely matched for uniform distribution, such that it is more likely that (assuming adequate liquid) substantially all of each $CO_2$ component (acid or base) will participate in a $CO_2$ generating reaction. In one embodiment, the following loading amounts are suitable for $CO_2$ generating components in this structure:

Weight/in. sq. of acid component for $CO_2$ (0.042 g/in^2)– 43% of $CO_2$ system
Weight/in. sq. of base component for $CO_2$ (0.0557 g/in^2)– 57% of $CO_2$ system It will be seen that the same structure with two tissue laminate layers 540A, 540B can be loaded such that the lower tissue laminate 540B can be used with fluff layer 400 to hold the two $CO_2$ generating components in the same manner as described for the single tissue laminate layer 540 and fluff layer 400 in FIG. 5. If this is done, top tissue laminate layer 540A is available for other purposes. For example, it may be loaded with both CO2 generating components, which can be used as a delayed release CO2 generating source, which will not be fully activated until sufficient liquid has moved up through both fluff layer 400 and lower tissue laminate 540B. As an alternative, top tissue laminate layer 540A is available for use to load an antimicrobial or other chemical system discussed above. In one embodiment, the following loading amounts are suitable for antimicrobial components in this structure:

Weight/in. sq. of antimicrobial (AM) component (0.0265 g/in^2 total); citric component=0.071 g/in^2 (64.5% of AM component); sorbic component 0.0094 g/in^2 (35.5% of AM component);

In a further embodiment based on the pad architecture of FIG. 6A, both CO2 components and a superabsorbent material, with or without additional components, can also be added to one laminate layer (or to both) and the fluff can deliver moisture to one or both laminate layers. Increasing superabsorbent material in the laminate in combination with the CO2 chemicals will allow for more CO2 generation later in the package life, because the superabsorbent material tends to release some absorbed moisture over time, allowing for more liquid to be available for reaction later in the package life. This is illustrated by test results shown in FIG. 10. The graph shows results from different pads represented by dotted, dashed and dot-dash lines showing CO2 generation for pads with different superabsorbent loading.

The above numbers are all based on the area of a tissue laminate layer used in a pad and do not include loadings into a fluff layer, which would have a different specification based on fluff weight.

The examples shown in FIGS. 5 and 6A, show the flow of liquids into the layers with chemical systems from a bottom liquid-permeable layer up, to show one form of controlled activation of layers based on an upward liquid migration. It will be seen that in other examples and applications a pad may have another permeable layer at the top and open edges in the pad layers. This would allow in-from-the-top in addition to or in place of in-from-the-bottom flows in the pad, and/or liquid flows into the sides of various layers. These structural alternatives available in the disclosed pad allow other chemical performance-over-time curves to be achieved with the disclosed pad architectures.

In another variant of layer architecture, the layers as shown in FIG. 6A may be rearranged so that the fluff layer 400 is sandwiched between a bottom laminate layer 540B placed below the fluff layer 400 and a top laminate layer 540A placed above the fluff layer 400. This configuration is shown in FIG. 6B.

The following are other possible variations of structure for the pads disclosed above:

Two or more tissue/chemical laminates can be incorporated into the pad at once making the pad five or more layers. Tissue laminates can be any mixture of CO2, antimicrobial, super absorbent material, odor absorbent material, O2 scavenger, ethylene scavenger or inhibitor or any system alone.

The absorbent pads disclosed above, wherein the third layer comprises, consists essentially of, or consists of a tissue laminate that contains a CO2 generator, wherein said CO2 generation system is an acid and a base.

The tissue laminate layer disclosed above, consists of two layered tissues with CO2 generating chemicals containing an acid and a base in the ratio of 57% base and 43% acid.

The CO2 generating chemicals disclosed above can consist of any of these acids: Citric acid, fumaric, ascorbic, maleic, or malic, or any combination.

The CO2 generating chemicals disclosed above can consist of the bases sodium bicarbonate, calcium carbonate, or like base.

The CO2 generator from an absorbent pad disclosed above provides a bacteriostatic effect on the protein in the package by interfering with biochemical pathways of bacteria preventing reproduction and therefore extending shelf life by reducing surface bacteria.

The absorbent pad disclosed above, wherein the third layer comprises, consists essentially of, or consists of a tissue laminate that contains an antimicrobial.

The antimicrobial in a pad disclosed above consists of citric acid and sorbic acid in a 64.5/35.5 ratio. Antimicrobials can also be Ag based, molecular iodine, ClO2, Cu based.

The antimicrobial in a pad disclosed above is a bacterial inhibitor that enhances food safety of the food package.

The absorbent pad as disclosed above, wherein a layer comprises consists essentially of, or consists of a tissue laminate that contains a super absorbent polymer or super absorbent fiber.

The super absorbent polymer disclosed above consists of a food-safe hydrophilic polymer such as optionally cross-linked polyacrylate.

Once the liquid is absorbed into the core of pad disclosed above, the super absorbent draws moisture toward the chemical systems initiating activation or can delay activation, based on the structure.

An absorbent pad as disclosed above, wherein the third layer comprises, consists essentially of, or consists of a tissue laminate that contains an oxygen scavenger. The oxygen scavenger is an enzymatic system. The enzymatic system is glucose oxidase. The oxygen scavenger starves bacteria of oxygen, inhibiting growth and therefore extending shelf life by reducing surface bacteria.

An absorbent pad as disclosed above, wherein the third or fourth layer comprises, consists essentially of, or consists of a tissue laminate that contains an ethylene scavenger or inhibitor.

An ethylene inhibitor used in a pad disclosed above is a sugar based powder containing 1-MCP or is a silver based powder.

An absorbent pad as disclosed above, wherein the fourth layer comprises, consists essentially of, or consists of fluff that contains an antimicrobial, CO2 generator, oxygen scavenger, odor absorbent material, ethylene scavenger or inhibitor, or super absorbent polymer or super absorbent fiber.

Figure 11:
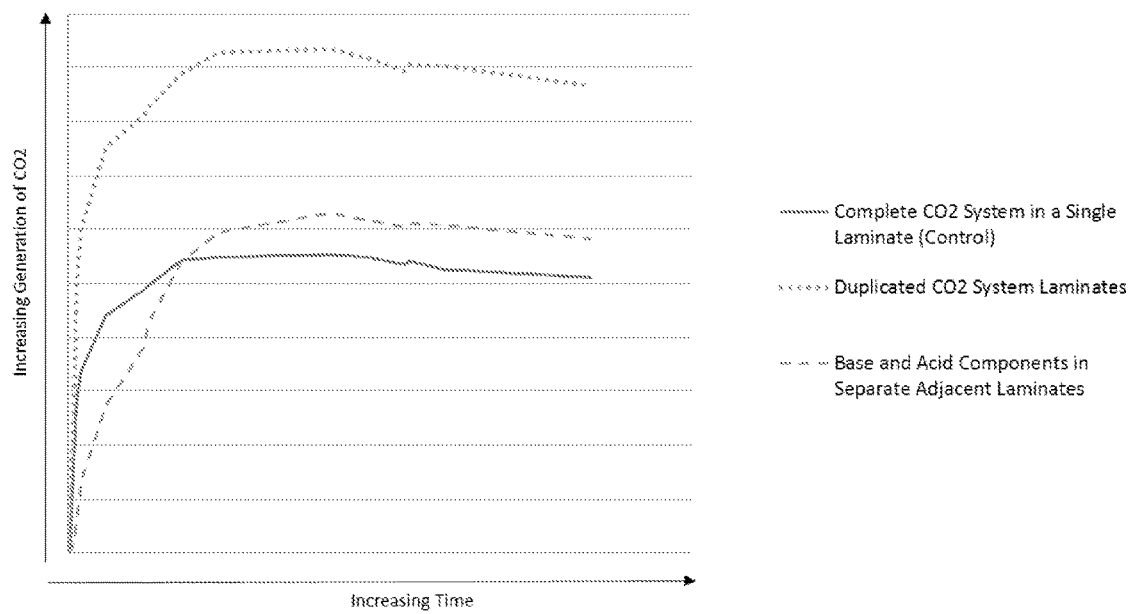
FIG. 11 shows a graph of the results of testing of $CO_2$ generation in pads with a fluff layer and separate but adjacent laminate layer(s). but with differences in $CO_2$ system loading. compared to a single laminate control pad.

An absorbent pad as disclosed above utilizes a reaction promoter that could be water, saline solution, blood, or protein enhancement solution The control of pad performance for liquid absorption and/or transport and for chemical activation and/or reaction that is possible with the above disclosed structures is further illustrated in comparative test results for different chemical loading strategies using the above architecture with fluff and tissue laminate layers. FIG. 11 shows results from an absorbent pad as shown in FIG. 6A in which the complete CO2 generating system has been replicated, to provide twice the chemical load of a pad with just one laminate, in each of the two separate laminates 540A and 540B. This increases the overall generation of CO2. The increase can be adjusted with precision, because of the ability to use the defined or predetermined, uniform distribution rate per unit area in a tissue laminate to select the amount of CO2 generation capacity to be added with a given area of tissue laminate. FIG. 11 shows also results from another embodiment of the pad of FIG. 6A, in which the two CO2 generating components have been separated into adjacent laminates 540A and 540B. This was found to delay the generation of CO2 and further control the generation profile as may be needed for certain applications. The resultant CO2 generation profiles can be seen in FIG. 11, in which the solid line is results from a pad with a CO2 system contained in a single laminate (control), the dotted line is results from a pad with the CO2 system replicated in two laminates, and the dashed line is results from a pad with the two CO2 system components separated into adjacent laminates.

Figure 12:
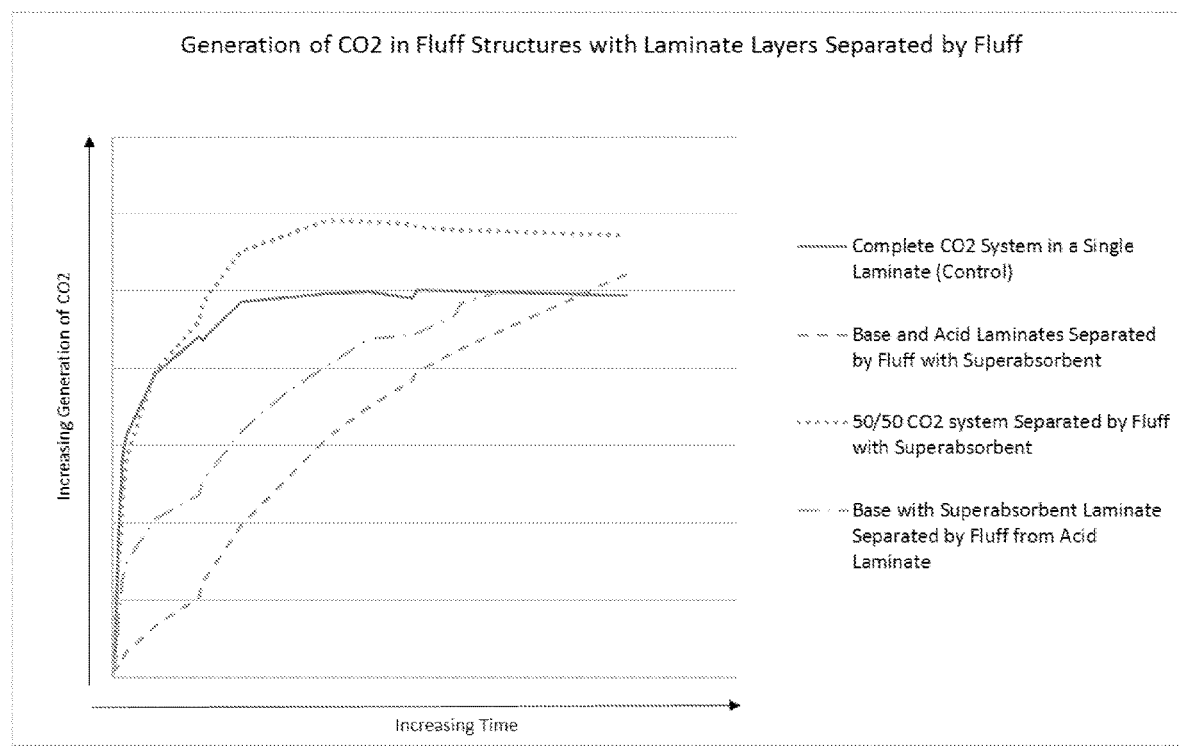
FIG. 12 shows a graph of the results of testing of $CO_2$ generation in pads with a fluff layer separating two laminate layer(s). but with differences in $CO_2$ system loading, compared to a single laminate control pad.

FIG. 12 shows results from use of structures as in FIG. 6B with a comparison to a control pad having a complete CO2 system in one laminate. Here the configurations tested included not only loading of the CO2 generating components but also the use of a superabsorbents as a way to control liquids released within a package. The pad configurations tested (using a compressed testing regime as described in connection with the above discussion of FIG. 8) included, in addition to the control: (a) an absorbent pad as shown in FIG. 6B in which two laminates containing the individual components of the CO2 generating system are separated by the absorbent fluff core 400, which contains superabsorbent 620; (b) in another embodiment of FIG. 6B, a pad with CO2 generating components placed in the separate laminates 540A and 540B, with the laminate closest to layer 200, the permeable layer, containing superabsorbent 620; and (c) in another embodiment of FIG. 6B, the complete CO2 system is been divided 50/50 between the two separate laminates 540A and 540B (or it could also be divided in any other proportions (0-100%/100-0%) in another embodiment), with the fluff layer 400 containing superabsorbent load 620. The resultant CO2 generation profiles can be seen in FIG. 12, in which the solid line is from a complete CO2 system contained in a single laminate, the dashed line is from the base and acid components of the CO2 system being separated in individual laminates by fluff 400 containing superabsorbent 620, the dash-dot line is the base and acid components of the CO2 system separated in individual laminates by fluff 400, with the base-containing laminate also containing superabsorbent 620, and the dotted line represents the CO2 system split 50/50 into individual laminates 540A and 540B separated by fluff 400 containing superabsorbent 620.

Figure 12A:
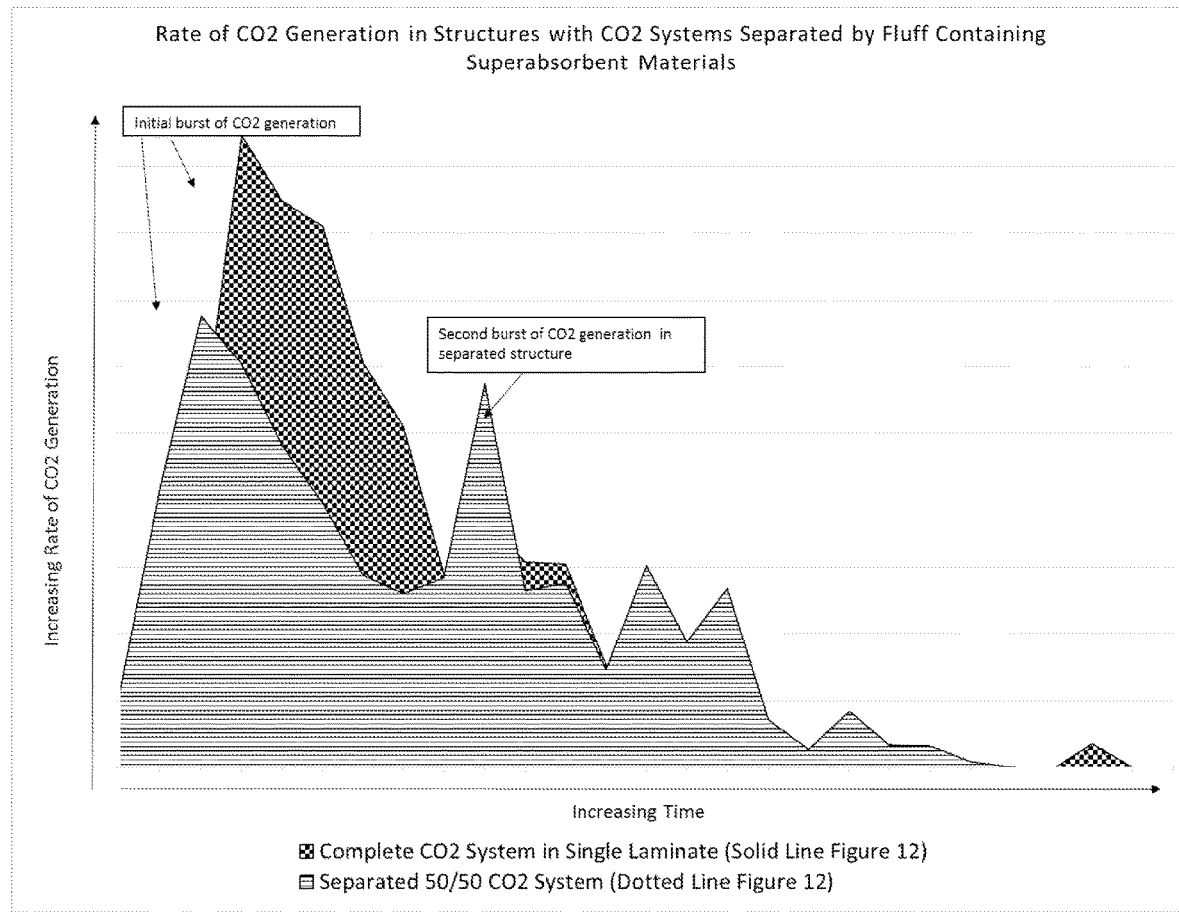
FIG. 12A shows the rate of $CO_2$ generation for two of the pads represented in FIG. 12

FIG. 12A shows another view of how control of CO2 generation effected by the disclosed structures of FIG. 12 work. FIG. 12A shows the rate of generation of CO2 for the CO2 system split 50/50 embodiment of FIG. 12, compared to the control pad of FIG. 12. In FIG. 12A, two distinct bursts of CO2 are observed for the split structure, compared to one burst in the single laminate control. This demonstrates that by separating the individual laminates, the entry of water into the pad can be controlled to delay the full effects of one laminate to a separate, later time.

Method of making pad. The present disclosure makes use of fluff as one layer of an absorbent pad. While fluff has been known as an effective absorbent, it has not been used widely in absorbent pads with chemical systems incorporated into a laminate or in a combination of a fluff-hosted chemical agent or system and a laminate-hosted chemical agent or system. Applicant found that by mating the fluff with a tissue layer, in one embodiment a tissue laminate layer, at the point where fluff is introduced into the manufacturing process provides a substrate for the fluff that allows use of a fluff layer in a range of thicknesses that makes it both a useful absorbent and a possible carrier of a chemical agent or system. Further, it is an absorbent that is flexible in providing absorbing capacity in absorbent pads as described above.

Figure 7:
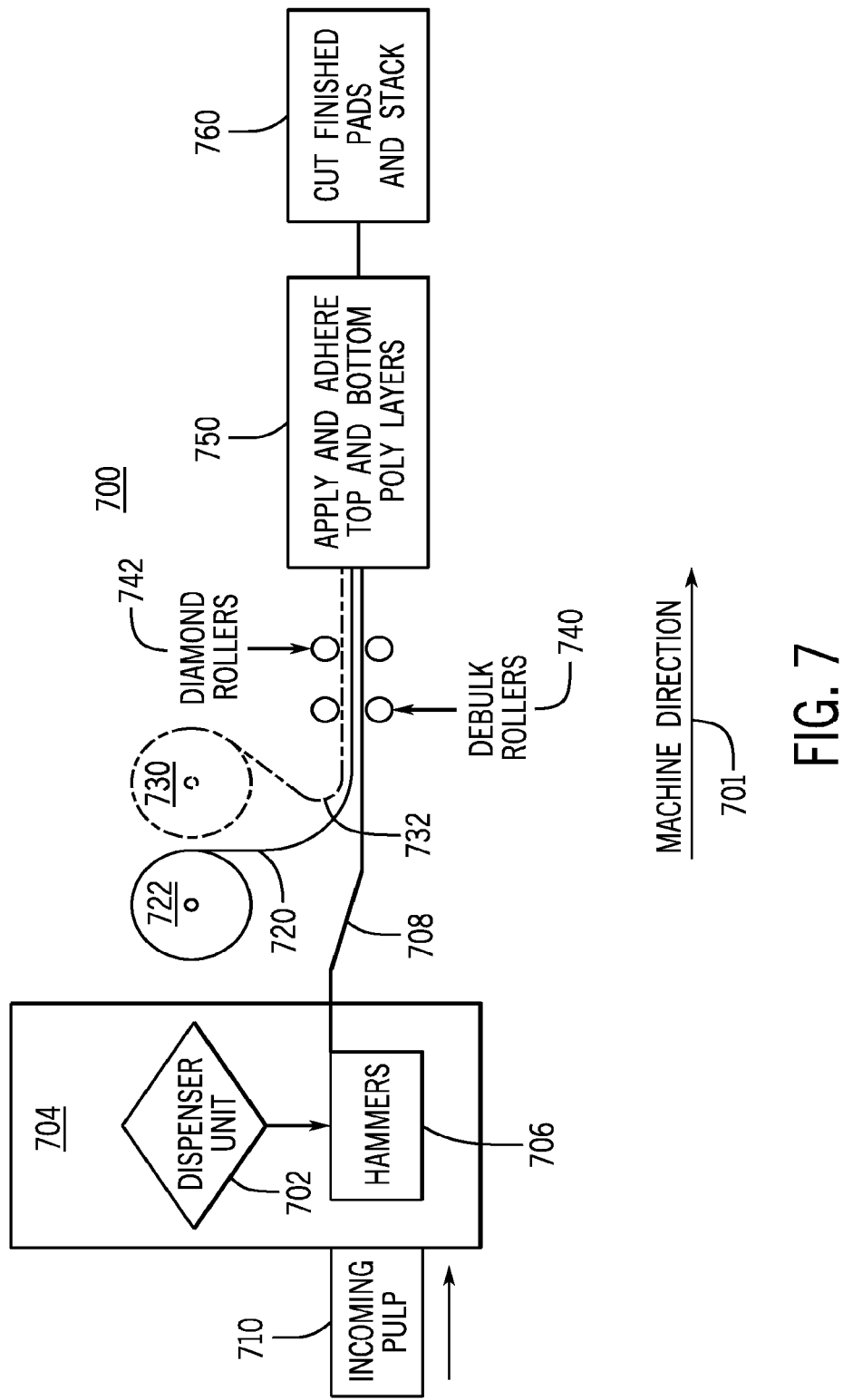
FIG. 7 shows schematically a pad manufacturing process in which a fluff web and a tissue laminate web are fed together into a nip where they become mechanically bonded, such that the laminate web serves as a substrate for the fluff, enabling the further steps shown to make absorbent pads.

FIG. 7 shows a schematic diagram of a high speed, web-based pad manufacturing process 700 in which fluff can be used to make absorbent pads. As seen in FIG. 7 the manufacturing line has a mill house 704, which contains a hammer mill with hammers 706. The direction of motion through the process is shown by machine direction arrow 701. A sheet of wood pulp raw material 710 for fluff is fed into the hammers 706 where it is chopped up and air-formed into a fluff layer of desired thickness, which in the form of a fluff web 708 is fed to an exit from the mill house 704 on a belt. If desired, a dispenser unit 702 may be placed in mill house 704 for distributing into the fluff web during its forming and/or during transport to an exit a predetermined amount of at least one chemical agent or system, with the distribution being substantially uniform per unit area of an area of the fluff web. (Loading the fluff with a chemical agent or system may also occur downstream.) Misting may be used to moisten the exiting fluff web 708. Above the belt transporting the fluff web 708 is located at least one roll 722 of a tissue web, in one embodiment a tissue laminate web 720, which is fed to match the speed of the fluff web 708 and laid on top of fluff web 708, with these two webs entering the nip of debulk rollers 740. The debulk rollers 740 compress the two webs together, which, aided as needed by moisture, forms a mechanical bond, such that the tissue laminate 720 serves as a substrate for the fluff web 708 in subsequent steps.

The two webs next travel to diamond rollers 742 which provide embossing, then proceed to a station 750 where a top poly layer and a bottom poly layer are applied from web rolls and adhered. The top and bottom poly layers now together with the mated fluff web 708 and tissue laminate web 720 are all fed through any desired finishing process and transported to final stations 760 for cutting the finished pads and stacking them for shipping.

It will be seen that further layers can be added to the web in this process, e.g., from a further, optional web feed roll 730 (shown in phantom) of tissue laminate web material located just downstream from roll 722. For example, further web feed roll 730 may be used to feed a second tissue laminate web 732 on top of the first tissue laminate web 720. This can be used to produce the two-laminate layer structure shown in FIG. 6A. Alternatively, by placing further web feed roll 730 under the mated webs 708, 720 and still located just downstream from roll 722 and upstream from debulk rollers 740, the second tissue laminate 732 can be placed on the opposite (lower, as seen in FIG. 7) side of the fluff web 708. The second tissue laminate 732 then also forms a mechanical bond, now with the other side of the fluff web 708 to sandwich it between laminates, such that the second tissue laminate also serves as a substrate for the fluff web 708 and adds to the functional layers of the resulting pads. This two-tissue laminate web, whether with the two laminates adjacent each other or sandwiching the fluff, continues through the remaining stations and steps shown in FIG. 7.

The present disclosure shows that the various absorbent pad architectures disclosed herein, with both fluff and tissue laminate layers capable of being loaded with chemical agents or systems and establishing flow paths for the liquids absorbed into the pad, lead to a pad capable of carrying out actions and reactions that extend the useful life a food item packaged with such pads. Moreover, the absorbent pad architectures allow control over dissolution and flow of, and/or reactions using, the loaded chemical agents or systems, including a reaction for CO2 generation. The architectures in particular permit the control of liquid flow and/or absorption and of reactions for CO2 generation, so the total amount of CO2 generated can be controlled, as well as the rate of CO2 generation over a period of time designed to coordinate with the expected useful life of the package. The following table assists in presenting some the various structures possible based on the pad architecture designs disclosed above:

| Layer (from top down) | | | | |
|---|---|---|---|---|
| 1st | Poly or Nonwoven | Poly or Nonwoven | Poly or Nonwoven | Poly or Nonwoven |
| 2nd | Tissue laminate | Tissue laminate Tissue laminate | Tissue laminate Fluff | Tissue laminate Tissue laminate |
| 3rd | Fluff | Fluff | Tissue laminate | Fluff Tissue laminate |
| 4th | Poly or Nonwoven | Poly or Nonwoven | Poly or Nonwoven | Poly or Nonwoven |

As described above, any of the tissue laminate or fluff layers may be loaded with a chemical agent or a system; any layer pair in fluid communication may be loaded with one of two components of a two-part system dissolvable in liquids entering the pad; and any layer may have a superabsorbent added to absorb liquids, in some embodiments effecting later release of absorbed liquids. It will further be understood that tissue laminate layers may be replicated beyond two and fluff layers may also be replicated, and that the order of any tissue laminate and fluff layers shown above may be inverted. Additionally, the first and fourth layers may be comprised of a nonwoven or poly film, or any other of the aforementioned materials described.

What is claimed is:

1. An absorbent pad comprising:
   a first, outer layer comprising a permeable or non-permeable material:
   a second, outer layer comprising a permeable or non-permeable material, placed on a side of the pad opposite the first, outer layer;
   a third layer disposed between the first layer and the second layer, and comprising at least a first ply and a second ply, with at least one chemical agent or system fixed in the third layer and being activated by contact with a fluid, the at least one chemical agent or system being in a predetermined amount distributed substantially uniformly per unit area between the at least first ply and second ply; and
   a fourth layer disposed between the first layer and the second layer and comprising fluff, the third layer being joined to the fourth layer to serve as a substrate for the fourth layer and being in fluid communication with the fourth layer.

2. The absorbent pad of claim 1, wherein the fourth layer is disposed between the third layer and the second layer or between the third layer and the first layer.

3. The absorbent pad of claim 1, wherein the third layer comprises at least two plies forming a volume in the third layer loaded with the at least one chemical agent or system.

4. The absorbent pad of claim 1, wherein the third layer comprises at least two plies of a cellulose or cotton-based or similar absorbent-based material.

5. The absorbent pad of claim 1, wherein the fourth layer is a sheet of fluff, with at least one chemical agent or system dispersed in granular form in the fourth layer, which is activated by fluid.

6. The absorbent pad of claim 1, wherein the first layer or the second layer or both comprises, consists essentially of, or consists of polyethylene, polypropylene, non-woven material or similar material with like properties.

7. The absorbent pad of claim 1, wherein the fourth layer comprises fluff further comprising a super absorbent material.

8. The absorbent pad of claim 1, wherein the at least one chemical agent or system fixed in the third layer has a functionality of carbon dioxide generation, super absorption, ethylene scavenging or inhibiting, oxygen scavenging, odor-removing, color- or taste-removing or changing, or antimicrobial properties.

9. The absorbent pad of claim 5, wherein the at least one chemical agent or system embedded in the fourth layer has a functionality of carbon dioxide generation, super absorption, ethylene scavenging or inhibiting, oxygen scavenging, odor-removing, color- or taste-removing or changing, or antimicrobial properties.

10. The absorbent pad of claim 1, wherein the at least one chemical agent or system fixed in the third layer comprises at least one of: a super absorbent fiber (SAF); super absorbent polymer (SAP); other super absorbent material; citric and sorbic acids mixed in about a 64.5:35.5 ratio; carbon dioxide chemicals consisting of acid and base in ratio of about 43:57 and an ethylene inhibitor or ethylene scavenger.

11. The absorbent pad of claim 9, wherein the at least one chemical agent or system fixed in the third layer or the fourth layer has the functionality of carbon dioxide generation and comprises at least one acid and at least one base coordinated with the acid for a CO2 generating system.

12. The absorbent pad of claim 11, wherein the CO2 generating system is embedded in the third layer in the following amounts:
   weight/in. sq. of an acid component for CO2 generation of about 0.042 g/in. sq.; and
   weight/in. sq. of base component for CO2 generation of about 0.0557 g/in. sq.

13. The absorbent pad of claim 1, wherein the third layer comprises two layered plies with CO2 generating chemicals containing about 57% base and about 43% acid and a super absorbent material, such as a polymer or a food-safe hydrophilic polymer, such as optionally cross-linked polyacrylate.

14. The absorbent pad of claim 1, wherein the third layer comprises two layered plies with at least one chemical agent or system embedded inside with adhesive on one or both plies, said adhesive being added at a total weight range 0.0015-0.0027/ft2 of a resulting two-ply structure.

15. The absorbent pad of claim 1, wherein the third layer is mechanically joined to the fourth layer to serve as a substrate.

16. The absorbent pad of claim 1, wherein molecules for activation by absorption or adsorption in the pad enter the pad via an adjacent one of the first and second outer layers, via the sides of layers and/or by flow between adjacent layers.

* * * * *